(12) United States Patent
Jentz et al.

(10) Patent No.: US 10,871,749 B2
(45) Date of Patent: Dec. 22, 2020

(54) SYSTEM AND METHOD FOR CONTROL MODULE ALARM WAKE

(71) Applicant: Ford Global Technologies, LLC, Dearborn, MI (US)

(72) Inventors: Robert Roy Jentz, Westland, MI (US); Sanyam Sharma, Dearborn, MI (US); Eric David Jefferson, Southfield, MI (US); Hugh Hamilton, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 380 days.

(21) Appl. No.: 15/807,305

(22) Filed: Nov. 8, 2017

(65) Prior Publication Data

US 2019/0137940 A1    May 9, 2019

(51) Int. Cl.
*G07C 5/00* (2006.01)
*G04F 3/08* (2006.01)
*B60W 50/04* (2006.01)
*G07C 5/08* (2006.01)

(52) U.S. Cl.
CPC ............ *G04F 3/08* (2013.01); *B60W 50/045* (2013.01); *G07C 5/008* (2013.01); *G07C 5/085* (2013.01); *G07C 5/0808* (2013.01); *B60W 2050/041* (2013.01)

(58) Field of Classification Search
CPC .... B60W 50/045; B60W 20/15; B60W 10/06; B60W 2710/0622; G07C 5/0808; G07C 5/085
USPC ....................................................... 701/29.1
See application file for complete search history.

(56) References Cited

U.S. PATENT DOCUMENTS

| | | | |
|---|---|---|---|
| 9,390,569 B2 | 7/2016 | Kumik et al. | |
| 2006/0111825 A1* | 5/2006 | Okada | B60W 50/0205 701/48 |
| 2012/0210154 A1* | 8/2012 | Hartwich | H04L 12/40039 713/323 |
| 2013/0238226 A1* | 9/2013 | Slaymaker | F02D 41/0027 701/113 |
| 2015/0332526 A1* | 11/2015 | Kurnik | G07C 5/085 701/31.7 |
| 2016/0025588 A1* | 1/2016 | Dudar | G01K 3/14 73/40.5 R |
| 2017/0067414 A1* | 3/2017 | Dudar | G07C 5/0816 |
| 2019/0137940 A1* | 5/2019 | Jentz | G07C 5/0808 |
| 2019/0375395 A1* | 12/2019 | Jentz | B60W 20/16 |

* cited by examiner

*Primary Examiner* — Peter D Nolan
*Assistant Examiner* — Wae L Louie
(74) *Attorney, Agent, or Firm* — Geoffrey Brumbaugh; McCoy Russell LLP

(57) ABSTRACT

Methods and systems are provided for scheduling an alarm wake up to self-wake a control module of a vehicle while the vehicle is off to perform requesting features, including diagnostic and non-diagnostic afterrun tasks. In one example, a method may include, during a shutdown event of the control module, querying a plurality of requesting features for alarm wake up times, receiving a plurality of alarm wake up times from the plurality of requesting features, selecting one alarm wake up time from the plurality of alarm wake up times received, and setting a timer for the selected alarm wake up time. When the timer elapses at the selected alarm wake up time, the control module is woken and a request to run is sent to each of the plurality of requesting features.

20 Claims, 7 Drawing Sheets

SYSTEM AND METHOD FOR CONTROL MODULE ALARM WAKE

FIELD

The present description relates generally to methods and systems for controlling a vehicle control module to self-wake during an afterrun period.

BACKGROUND/SUMMARY

Given the increasing complexity of modern vehicles, vehicle control modules (e.g., powertrain control module, engine control module, transmission control module, etc.) are often configured to self-wake in an afterrun period, after the vehicle has been shut down, to perform various features. The various features may include running diagnostics, uploading vehicle data (e.g., to the cloud), or downloading control strategies and calibrations (e.g., from the cloud), for example. Further, each of the various features may request a different wake up time, which may complicate control module wake strategies and result in missed wake ups and/or unexpected wake ups.

Other attempts to arbitrate multiple wake up requests include scheduling wake up requests with an alarm wake manager. One example approach is shown by Kurnik et al. in U.S. Pat. No. 9,390,569 B2. Therein, a method is disclosed for a wake up request manager that collects wake up requests from onboard vehicle subsystems, control modules, and/or processing tasks during a controller shutdown procedure to set a wake up time for the controller. The closest (in time) requested wake up time is given priority, while the other requested wake up times are queued so that the controller will be woken at all of the requested wake up times.

However, the inventors herein have recognized potential issues with such systems. As one example, upon the controller waking at the set time, conditions, such as environmental conditions, may not be optimal for performing the scheduled feature, particularly when the scheduled feature is a diagnostic routine. Performing the diagnostic routine during suboptimal conditions may increase an occurrence of false fault detections, for example. As another example, repeated wake up events during a vehicle key-off period may drain a battery of the vehicle.

In one example, the issues described above may be addressed by a method comprising: querying a first requesting feature and a second requesting feature for alarm wake up times; selecting a first alarm wake up time from the first requesting feature and not selecting a second alarm wake up time from the second requesting feature; setting a timer for the first alarm wake up time; and sending a request to run to both the first requesting feature and the second requesting feature upon the timer elapsing. In this way, both the first requesting feature and the second requesting feature may be performed during a single alarm wake (e.g., at the first alarm wake up time).

As one example, the first requesting feature and the second requesting feature may be included in a control module of a vehicle. In response to the querying, the first requesting feature and the second requesting feature may each determine their respective alarm wake up times based on current vehicle conditions and their respective entry conditions. The control module may be shut down (e.g., in a sleep mode) after the timer is set and may be woken up when the timer elapses. Upon receiving the request to run, the first requesting feature and the second requesting feature may each compare the current vehicle conditions with their respective entry conditions. The first requesting feature may run in response to entry conditions for the first requesting feature being met and may not run in response to the entry conditions for the first requesting feature not being met, independent of whether or not the second requesting feature runs and if its alarm wake up time was selected. Similarly, the second requesting feature may run in response to entry conditions for the second requesting feature being met and may not run in response to the entry conditions for the second requesting feature not being met, independent of whether or not the first requesting feature runs and if its alarm wake up time was selected. Further, any of the first requesting feature or the second requesting features that does not run may request a new alarm wake up time. In this way, each of the first requesting feature and the second requesting feature may only be performed when their respective entry conditions are met, enabling each feature to be performed when conditions are optimal, thereby reducing an occurrence of false fault detections.

As another example, an alarm wake up counter may be incremented after the control module is woken up. Upon receiving request(s) for the new alarm wake up time, the timer may only be set for the new alarm wake up time if the count of the alarm wake up counter is less than a threshold count. In this way, a vehicle battery will not be drained by repeated alarm wake ups.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
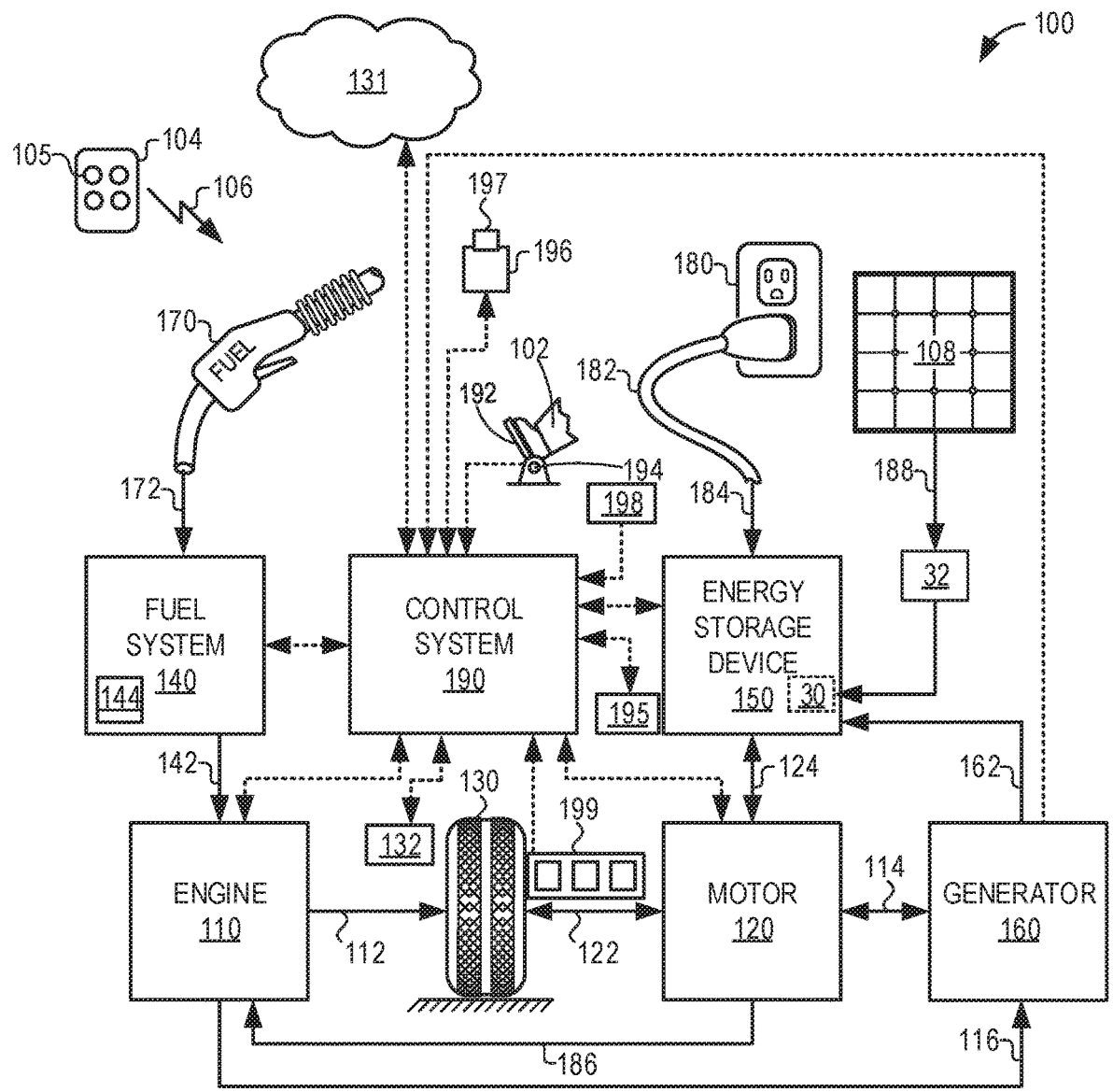
FIG. 1 schematically shows an example vehicle propulsion system.
Figure 2:
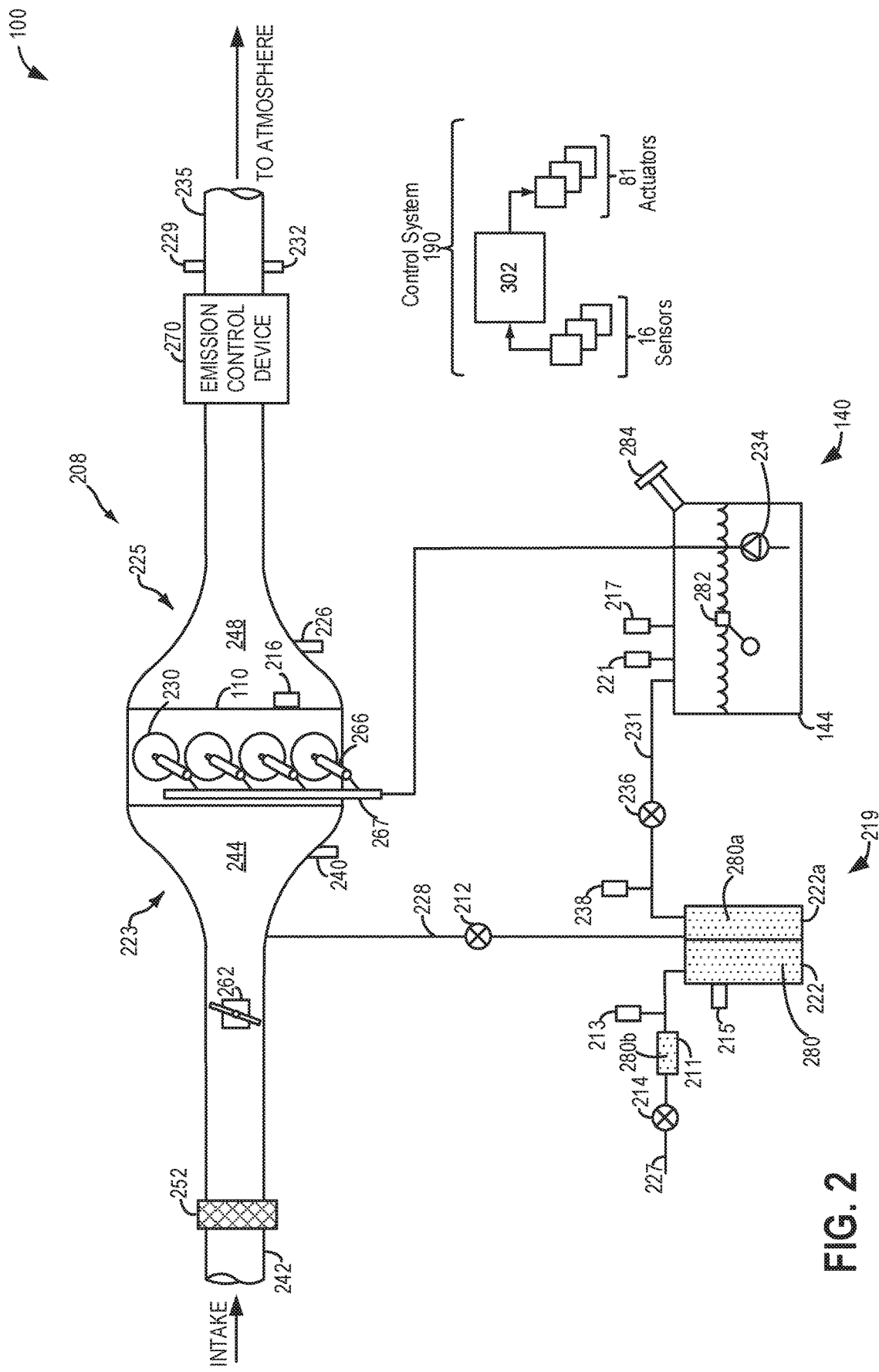
FIG. 2 shows a schematic depiction of a fuel system and evaporative emission system coupled to an engine system that may be included in a vehicle propulsion system.
Figure 3:
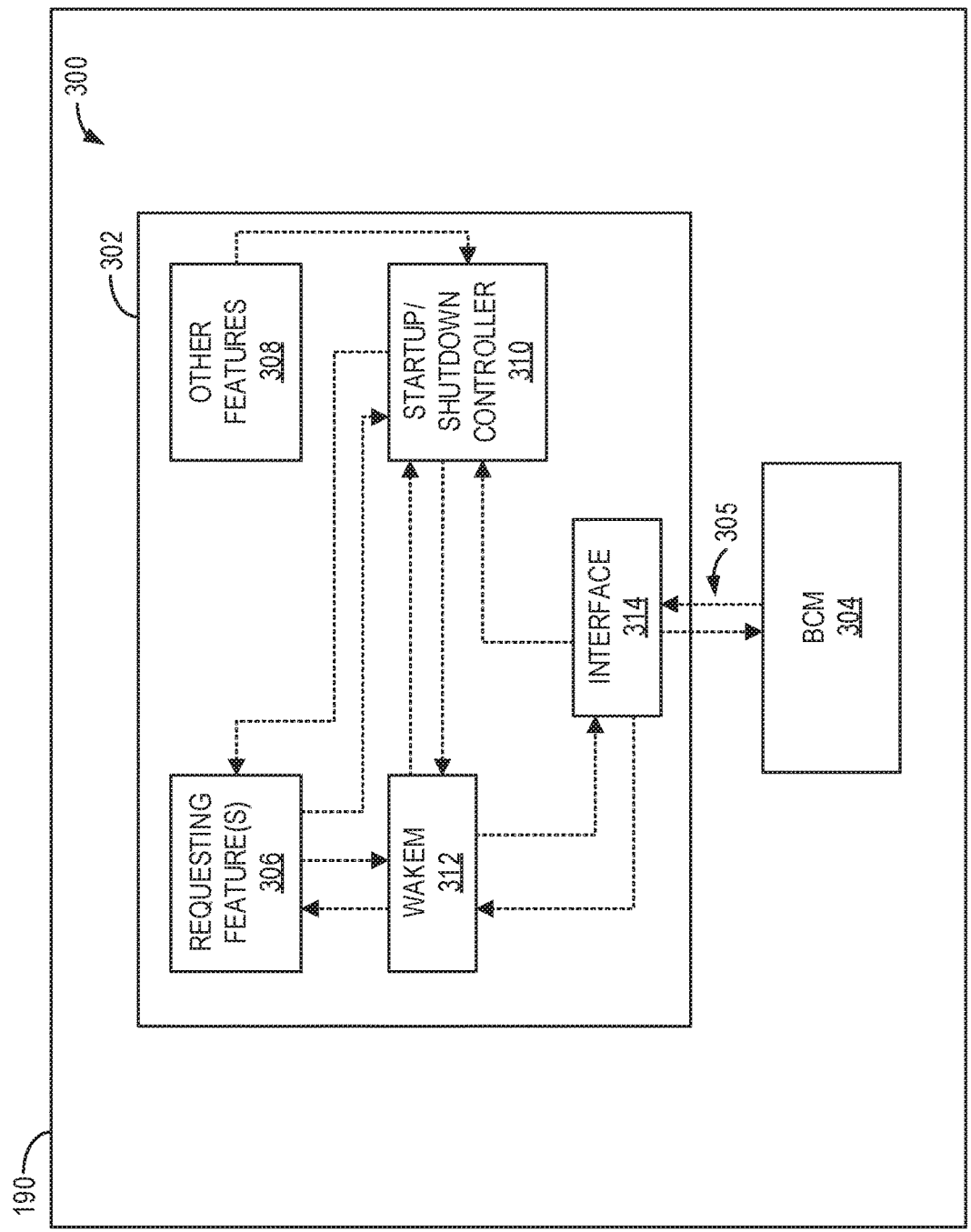
FIG. 3 shows a block diagram of a first example of an alarm wake system.
Figure 4:
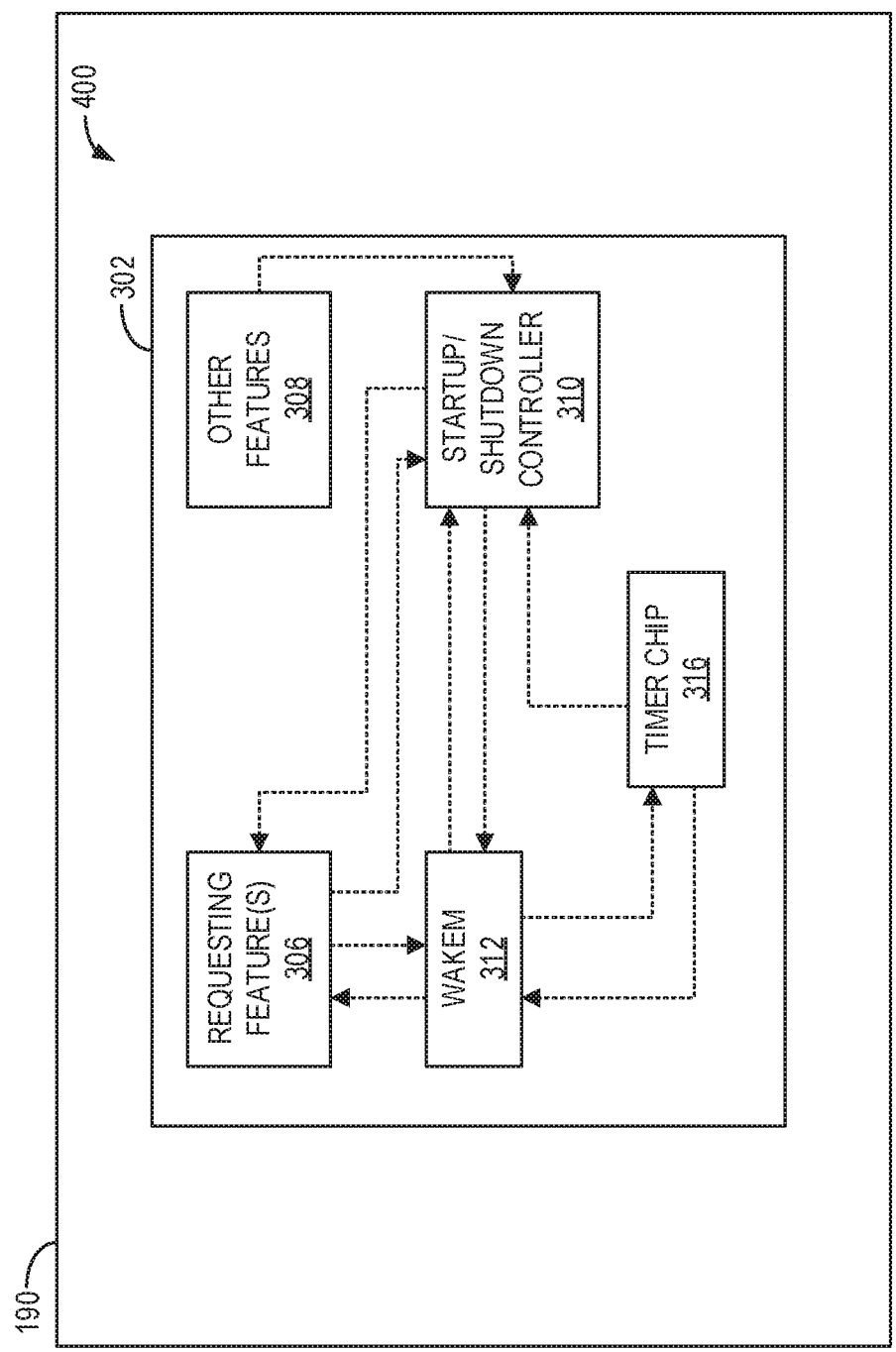
FIG. 4 shows a block diagram of a second example of an alarm wake system.

The following description relates to systems and methods for waking a control module of a vehicle system, such as the example vehicle system shown in FIG. 1, while the vehicle is off using an alarm wake system, such as the example alarm wake systems shown in FIGS. 3 and 4. For example, the alarm wake system may include requesting features that request alarm wake up times during a control module shutdown event, a wake manager that receives the requested alarm wake up times from the requesting features and selects an alarm wake up time, and a timer that is set for the selected alarm wake up time by the wake manager, such as according to the example method of FIG. 5. The vehicle system may further include an evaporative emissions system, such as shown in FIG. 2, and the requesting features may include an engine-off evaporative emissions system diagnostic test. Upon the timer elapsing at the selected alarm wake up time, the control module may be awoken while the vehicle remains off to perform the requesting features, including the engine-off evaporative emissions system diagnostic test, responsive to respective entry conditions for the requesting features being met, such as according to the example method of FIG. 6. FIG. 7 shows a prophetic example timeline for setting an alarm wake up time at the timer and waking the control module to perform the requesting features upon the timer elapsing at the alarm wake up time.

FIG. 1 illustrates an example vehicle system 100. Vehicle system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle system 100 may utilize a variety of different operational modes depending on operating conditions encountered by the vehicle propulsion system. Some of these modes may enable engine 110 to be maintained in an off state (e.g., set to a deactivated state) where combustion of fuel at the engine is discontinued and the engine is at rest. For example, under select operating conditions, motor 120 may propel the vehicle via a drive wheel 130, as indicated by an arrow 122, while engine 110 is deactivated.

During other operating conditions, engine 110 may be set to a deactivated state (as described above) while motor 120 may be operated to charge an energy storage device 150. For example, motor 120 may receive wheel torque from drive wheel 130, as indicated by arrow 122, and may convert the kinetic energy of the vehicle to electrical energy for storage at energy storage device 150, as indicated by an arrow 124. This operation may be referred to as regenerative braking of the vehicle. Thus, motor 120 may function as a generator in some examples. However, in other examples, a generator 160 may instead receive wheel torque from drive wheel 130 and may convert the kinetic energy of the vehicle to electrical energy for storage at energy storage device 150, as indicated by an arrow 162. As an additional example, motor 120 may use energy stored at energy storage device 150 to crank engine 110 in a starting operation, as indicated by an arrow 186. Energy storage device may include one or more batteries. For example, energy storage device may include one or more traction batteries and/or one or more starting, lighting, and ignition (SLI) batteries.

During still other operating conditions, engine 110 may be operated by combusting fuel received from a fuel system 140, as indicated by an arrow 142. For example, engine 110 may be operated to propel the vehicle via drive wheel 130, as indicated by an arrow 112, while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle system 100 may be configured as a series type vehicle propulsion system, whereby the engine does not directly propel the drive wheels. Rather, engine 110 may be operated to power motor 120, which may in turn propel the vehicle via drive wheel 130, as indicated by arrow 122. For example, during select operating conditions, engine 110 may drive generator 160, as indicated by an arrow 116, which may in turn supply electrical energy to one or more of motor 120, as indicated by an arrow 114, or energy storage device 150, as indicated by arrow 162. As another example, engine 110 may be operated to drive motor 120, which may in turn function as a generator to convert the engine output to electrical energy. The electrical energy may be stored at energy storage device 150 for later use by the motor, for example.

Fuel system 140 may include one or more fuel storage tanks 144 for storing fuel on-board the vehicle, one or more fuel pumps, and one or more fuel rails. For example, fuel tank 144 may store one or more liquid fuels, including (but not limited to) gasoline, diesel, and alcohol fuels. In some examples, the fuel may be stored on-board the vehicle as a blend of two or more different fuels. For example, fuel tank 144 may be configured to store a blend of gasoline and ethanol (such as E10, E85, etc.) or a blend of gasoline and methanol (such as M10, M85, etc.), whereby these fuels or fuel blends may be delivered to engine 110 as indicated by arrow 142. Still other suitable fuels or fuel blends may be supplied to engine 110, where they may be combusted to produce an engine output (e.g., torque). The engine output may be utilized to propel the vehicle (as indicated by arrow 112) or to recharge energy storage device 150 via motor 120 or generator 160. Further, in some examples, fuel system 140 may be coupled to an evaporative emissions system, as will be described with respect to FIG. 2.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

A control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Further still, control system 190 may include a plurality of control modules. Each of the plurality of control modules may include a microprocessor unit, input/output ports, an electronic storage medium for executable programs (e.g., executable instructions) and calibration values, such as a non-transitory read-only memory (ROM) chip, random access memory (RAM), keep alive memory (KAM), and a data bus. The plurality of control modules may communicate with each other over a controller area network (CAN), as will be further described with respect to FIGS. 3 and 4.

Control system 190 may receive an indication of an operator requested output of the vehicle propulsion system from a vehicle operator 102. For example, control system 190 may receive sensory feedback from a pedal position sensor 194 concerning a position of a pedal 192. Pedal 192 may refer schematically to a brake pedal and/or an accelerator pedal that may be depressed by vehicle operator 102. Furthermore, in some examples, control system 190 may be in communication with a remote engine start receiver 195 (or transceiver) that receives wireless signals 106 from a key fob 104 having a remote start button 105. In other examples (not shown), a remote engine start may be initiated via a cellular telephone or a smartphone-based system where a user's telephone sends data to a server and the server communicates with the vehicle to start the engine.

Energy storage device 150 may periodically receive electrical energy from a power source 180 residing external to the vehicle (e.g., an external stationary power grid that is not part of the vehicle), as indicated by an arrow 184. As a non-limiting example, vehicle system 100 may be configured as a plug-in HEV, whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

In still other examples, vehicle system 100 may include one or more solar cells 108, operative to convert incident solar radiation into electrical energy. The solar cells 108 are electrically coupled to a solar battery 30 via a charge controller 32. Solar cells 108 and charge controller 32 are operative to supply electrical current for charging solar battery 30. In this example, solar battery 30 is housed within and electrically coupled to energy storage device 150, but in other configurations, solar battery 30 may be electrically coupled to energy storage device 150 while being housed separately. In still other configurations, solar battery 30 may be both physically and electrically isolated from energy storage device 150. Solar battery 30 may thus be configured to provide or receive charge from energy storage device 150, depending on engine operating conditions, charge status, and battery requirement(s). In some examples, solar battery 30 may be configured to independently supply charge directly to vehicle actuators and devices. Further, in some examples, charge controller 32 may be used to directly supply power to vehicle actuators and devices without requiring charge to first be stored in solar battery 30.

Solar cells 108 may be mounted on any convenient exterior surface of the vehicle, for example, a vehicle roof, hood, trunk, etc. However, solar cells 108 may additionally or alternatively be mounted on the interior of the vehicle, such as on a dashboard or other passenger compartment surface in proximity to a window or interior light bulb. In general, the solar cells are operative to convert solar radiation incident thereon into electrical energy. In some embodiments, solar cells 108 may comprise a series of photovoltaic cells formed from an amorphous semi-conductor material, such as silicon. Additionally, individual photovoltaic cells may be interconnected so as to provide a constant flow of electrical energy to a common output cable 188, which electrically couples solar cells 108 to charge controller 32 and solar battery 30. In this way, solar cells 108 may generate electrical energy with which to propel the vehicle or power one or more vehicle actuators and devices.

Fuel system 140 may periodically receive fuel from a fuel source residing external to the vehicle. As a non-limiting example, vehicle system 100 may be refueled by receiving fuel via a fuel dispensing device 170, as indicated by an arrow 172. In some examples, fuel tank 144 may be configured to store the fuel received from fuel dispensing device 170 until it is supplied to engine 110 for combustion. In some examples, control system 190 may receive an indication of the level of fuel stored in fuel tank 144 via a fuel level sensor. The level of fuel stored in fuel tank 144 (e.g., as identified by the fuel level sensor) may be communicated to the vehicle operator, for example, via a fuel gauge or indication in a vehicle instrument panel (e.g., message center) 196.

The vehicle system 100 may also include an ambient temperature/humidity sensor 198 and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input devices for receiving an operator input, such as buttons, touch screens, voice input/recognition, etc. For example, the vehicle instrument panel 196 may include a refueling button 197, which may be manually actuated or pressed by a vehicle operator to initiate refueling.

Control system 190 may be communicatively coupled to other vehicles or infrastructures using appropriate communications technologies. For example, control system 190 may be coupled to other vehicles or infrastructures via a wireless network 131, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. Information exchanged between vehicles can be either directly communicated between vehicles or can be multi-hop. In some examples, longer range communications (e.g. WiMax) may be used in place of or in conjunction with V2V or V2I2V to extend the coverage area by a few miles. In still other examples, vehicle control system 190 may be communicatively coupled to other vehicles or infrastructures via wireless network 131 and the internet (e.g. the cloud).

Vehicle system 100 may also include an on-board navigation system 132 (for example, a Global Positioning System, GPS) that an operator of the vehicle may interact with. The navigation system 132 may include one or more location sensors for assisting in estimating vehicle speed, vehicle altitude, vehicle position/location, etc. This information may be additionally used to infer engine operating parameters, such as local barometric pressure. As discussed above, control system 190 may further be configured to receive information via the internet or other communication networks. Information received from the GPS may be cross-referenced to information available via the internet to determine local weather conditions, local vehicle regulations, etc.

Next, FIG. 2 schematically shows aspects of an example engine system 208, including engine 110, that may be coupled in vehicle 100. Components described with reference to FIG. 2 that have the same identification labels as components described with reference to FIG. 1 are the same components and may operate as previously described. Further, some components may not be reintroduced.

Engine 110 is shown having a plurality of cylinders 230. Engine 110 may include an engine intake system 223 and an engine exhaust system 225. Engine intake system 223 may include an air intake throttle 262 fluidly coupled to an intake manifold 244 via an intake passage 242. Intake air may be routed to intake throttle 262 after passing through an air filter 252 coupled to intake passage 242 upstream of intake throttle 262. Engine exhaust system 225 includes an exhaust manifold 248 leading to an exhaust passage 235 that routes exhaust gas to the atmosphere. Engine exhaust system 225 may include one or more emission control devices 270 mounted in a close-coupled position. The one or more emission control devices may include a three-way catalyst, a lean nitrogen oxide (NOx) trap, a selective catalytic reduction (SCR) catalyst, a particulate filter (e.g., a diesel particulate filter or a gasoline particulate filter), an oxidation catalyst, etc. As one example, one or more NOx sensors may be positioned upstream and/or downstream of emission control devices 270, such as for measuring an efficiency of NOx conversion by emission control devices 270. It will be appreciated that other components may be included in the engine, such as a variety of valves and sensors, as further elaborated in herein. In some embodiments, wherein engine system 208 is a boosted engine system, the engine system may further include a boosting device, such as a turbocharger (not shown).

Engine system 208 is coupled to fuel system 140 and an evaporative emissions system 219. Fuel system 140 includes fuel tank 144 coupled to a fuel pump 234, the fuel tank supplying a fuel to engine 110 that propels vehicle 100, as described above with respect to FIG. 1. Evaporative emissions system 219 includes a fuel vapor storage canister 222. During a fuel tank refueling event, fuel may be pumped into the vehicle from an external source through a refueling port 284. A fuel level sensor 282 located in fuel tank 144 may provide an indication of a fuel level ("Fuel Level Input") to a control module 302 of control system 190. As depicted, fuel level sensor 282 may comprise a float connected to a variable resistor. Alternatively, other types of fuel level sensors may be used.

Fuel pump 234 is configured to deliver pressurized fuel to fuel injectors of engine 110, such as an example fuel injector 266. One or more fuel injectors may be provided for each cylinder. For example, pressurized fuel may be delivered to fuel injector 266 and the additional fuel injectors via a fuel rail 267. It will be appreciated that fuel system 140 may be a return-less fuel system, a return fuel system, or various other types of fuel system. Vapors generated in fuel tank 144 may be routed to fuel vapor storage canister 222 via a conduit 231 for storage before being purged to the engine intake system 223.

Fuel vapor storage canister 222 is filled with an appropriate adsorbent 280 for temporarily trapping fuel vapors (including vaporized hydrocarbons) generated during fuel tank refueling operations, diurnal vapors, and/or running-loss vapors. In one example, adsorbent 280 is activated charcoal (e.g., carbon). While a single fuel vapor storage canister 222 is shown, it will be appreciated that fuel system 140 and evaporative emissions system 219 may include any number of fuel vapor storage canisters. When purging conditions are met, such as when the fuel vapor storage canister is saturated, vapors stored in fuel vapor storage canister 222 may be purged to engine intake system 223 via a purge line 228 by opening a canister purge valve (CPV) 212, which may be a normally closed valve. In one example, canister purge valve 212 may be a solenoid valve wherein opening or closing of the valve is performed via actuation of a canister purge solenoid.

Fuel vapor storage canister 222 may include a buffer 222a (or buffer region), each of the fuel vapor storage canister and the buffer comprising adsorbent. For example, buffer 222a is shown packed with an adsorbent 280a. As shown, the volume of buffer 222a may be smaller than (e.g., a fraction of) the volume of fuel vapor storage canister 222. Adsorbent 280a in the buffer 222a may be same as or different from adsorbent 280 in the fuel vapor storage canister (e.g., both may include charcoal). Buffer 222a may be positioned within fuel vapor storage canister 222 such that during fuel vapor storage canister loading, fuel tank vapors are first adsorbed within the buffer, and then when the buffer is saturated, further fuel tank vapors are adsorbed in the fuel vapor storage canister. In comparison, during fuel vapor storage canister purging, fuel vapors are first desorbed from the fuel vapor storage canister (e.g., to a threshold amount) before being desorbed from the buffer. In other words, loading and unloading of the buffer is not linear with the loading and unloading of the fuel vapor storage canister. As such, the effect of the fuel vapor storage canister buffer is to dampen any fuel vapor spikes flowing from the fuel tank to the fuel vapor storage canister, thereby reducing the possibility of any fuel vapor spikes going to the engine.

Fuel vapor storage canister 222 includes a vent 227 for routing gases out of the fuel vapor storage canister 222 to the atmosphere when storing fuel vapors from fuel tank 144. Vent 227 may also allow fresh air to be drawn into fuel vapor storage canister 222 when purging stored fuel vapors to engine intake 223 via purge line 228 and canister purge valve 212. While this example shows vent 227 communicating with fresh, unheated air, various modifications may also be used. Vent 227 may include a canister vent valve (CVV) 214 to adjust a flow of air and vapors between fuel vapor storage canister 222 and the atmosphere. When included, the vent valve may be a normally open valve so that air, stripped of fuel vapor after having passed through the fuel vapor storage canister, can be pushed out to the atmosphere (for example, during refueling while the engine is off). Likewise, during purging operations (for example, during fuel vapor storage canister regeneration and while the engine is running), the fuel vapor storage canister vent valve may be opened to allow a flow of fresh air to strip the fuel vapors stored in the fuel vapor storage canister. In one example, canister vent valve 214 may be a solenoid valve wherein opening or closing of the valve is performed via actuation of a canister vent solenoid. In particular, the canister vent valve may be in an open position that is closed upon actuation of the canister vent solenoid.

Evaporative emissions system 219 may further include a bleed fuel vapor storage canister 211. Hydrocarbons that desorb from fuel vapor storage canister 222 (hereinafter also referred to as the "main fuel vapor storage canister") may be adsorbed within the bleed fuel vapor storage canister. Bleed fuel vapor storage canister 211 may include an adsorbent 280b that is different than the adsorbent material included in main fuel vapor storage canister 222. Alternatively, the adsorbent 280b in bleed fuel vapor storage canister 211 may be the same as adsorbent 280 included in main fuel vapor storage canister 222.

A hydrocarbon (HC) sensor 213 may be present in evaporative emissions system 219 to indicate the concentration of hydrocarbons in vent 227. As illustrated, hydrocarbon sensor 213 is positioned between main fuel vapor storage canister 222 and bleed fuel vapor storage canister 211. A probe (e.g., sensing element) of hydrocarbon sensor 213 is exposed to and senses the hydrocarbon concentration of fluid flow in vent 227. Hydrocarbon sensor 213 may be used by the engine control system 190 for determining breakthrough of hydrocarbon vapors from main fuel vapor storage canister 222, in one example.

One or more temperature sensors 215 may be coupled to and/or within fuel vapor storage canister 222. As fuel vapor is adsorbed by the adsorbent in the fuel vapor storage canister, heat is generated (heat of adsorption). Likewise, as fuel vapor is desorbed by the adsorbent in the fuel vapor storage canister, heat is consumed. In this way, the adsorption and desorption of fuel vapor by the fuel vapor storage canister may be monitored and estimated based on temperature changes within the fuel vapor storage canister.

Vehicle 100 may have reduced engine operation times due to the vehicle being powered by engine system 208 during some conditions and by energy storage device 150 (shown in FIG. 1) under other conditions (such as when vehicle 100 a hybrid electric vehicle) or due to the engine shutting down when the vehicle is on and at rest (such as when vehicle 100 is a stop/start vehicle). While the reduced engine operation times reduce overall carbon emissions from the vehicle, they may also lead to insufficient purging of fuel vapors from evaporative emission system 219. To at least partially address this, a fuel tank isolation valve (FTIV) 236 may be optionally included in conduit 231 such that fuel tank 144 is coupled to fuel vapor storage canister 222 via the valve. During regular engine operation, FTIV 236 may be kept closed to limit the amount of diurnal or "running loss" vapors directed to fuel vapor storage canister 222 from fuel tank 144. During refueling operations and selected purging conditions, FTIV 236 may be temporarily opened, e.g., for a duration, to direct fuel vapors from fuel tank 144 to fuel vapor storage canister 222. While the depicted example shows FTIV 236 positioned along conduit 231, in alternate embodiments, the isolation valve may be mounted on fuel tank 144.

One or more pressure sensors may be coupled to fuel system 140 and evaporative emissions system 219 for providing an estimate of a fuel system and an evaporative emissions system pressure, respectively. In the example illustrated in FIG. 2, a first pressure sensor 217 is coupled directly to fuel tank 144, and a second pressure sensor 238 is coupled to conduit 231 between FTIV 236 and fuel vapor storage canister 222. For example, first pressure sensor 217 may be a fuel tank pressure transducer (FTPT) coupled to fuel tank 144 for measuring a pressure of fuel system 140, and second pressure sensor 238 may measure a pressure of evaporative emissions system 219. In alternative embodiments, first pressure sensor 217 may be coupled between fuel tank 144 and fuel vapor storage canister 222, specifically between the fuel tank and FTIV 236. In still other embodiments, a single pressure sensor may be included for measuring both the fuel system pressure and the evaporative system pressure, such as when FTIV 236 is open or omitted. In some examples, control system 190 may infer and indicate undesired evaporative emissions (e.g., undesired hydrocarbon emissions) based on changes in an evaporative emissions system pressure during an emissions test, such as may be performed during a vehicle afterrun period, as further described below with respect to FIGS. 3-6.

One or more temperature sensors 221 may also be coupled to fuel system 140 for providing an estimate of a fuel system temperature. In one example, the fuel system temperature is a fuel tank temperature, wherein temperature sensor 221 is a fuel tank temperature sensor coupled to fuel tank 144. While the depicted example shows temperature sensor 221 directly coupled to fuel tank 144, in alternate embodiments, the temperature sensor may be coupled between the fuel tank and fuel vapor storage canister 222.

Control system 190 is shown receiving information from a plurality of sensors 16 (various examples of which are described herein) and sending control signals to a plurality of actuators 81 (various examples of which are described herein). As one example, sensors 16 may include an exhaust gas sensor 226 located upstream of emission control device 270, a temperature sensor 232 coupled to exhaust passage 235, a manifold absolute pressure (MAP) sensor 240 coupled to intake manifold 244, an engine coolant temperature sensor 216 coupled to a cooling sleeve of engine 110, FTPT 217, second pressure sensor 238, hydrocarbon sensor 213, temperature sensor 221, and a pressure sensor 229 located downstream of emission control device 270. Other sensors, such as additional pressure, temperature, air/fuel ratio, and composition sensors, may be coupled to various locations in the vehicle 100. For example, an estimate of the MAP or manifold vacuum (ManVac) may be obtained by control module 302 from MAP sensor 240. Alternatively, MAP may be inferred from alternate engine operating conditions, such as mass air flow (MAF), as measured by a MAF sensor (not shown) coupled to intake manifold 244. As another example, actuators 81 may include fuel injector 266, FTIV 236, purge valve 212, vent valve 214, fuel pump 234, and throttle 262.

As described above with reference to FIG. 1, control system 190 may further receive information regarding the location of the vehicle from an on-board GPS. Information received from the GPS may include vehicle speed, vehicle altitude, vehicle position, etc. This information may be used to infer engine operating parameters, such as local barometric pressure. Control system 190 may further be configured to transmit or receive information via the internet or other communication networks. Information received from the GPS may be cross-referenced to information available via the internet to determine local weather conditions, local vehicle regulations, etc. Control system 190 may use the internet to obtain updated software modules, which may be stored in non-transitory memory.

Control module 302 of control system 190 may be configured as a conventional microcomputer including a microprocessor unit, input/output ports, read-only memory, random access memory, keep alive memory, a CAN bus, etc. Control module 302 may be configured as a powertrain control module (PCM), for example. Control module 302 may receive input data from the various sensors, process the input data, and trigger the actuators in response to the processed input data based on instruction or code programmed therein corresponding to one or more routines. Example control routines are described herein with regard to FIGS. 5 and 6.

In some examples, control module 302 may be placed in a reduced power mode or sleep mode, wherein the control module maintains essential functions only and operates with a lower battery consumption than in a corresponding awake mode. For example, the control module may be placed in the sleep mode following a vehicle key-off event (e.g., a human driver removing a key from a vehicle, leaving the proximity of the vehicle with a key fob, and/or otherwise instructing the vehicle to be in an off/inoperative state, at which time the engine may be stopped rotating and electrical propulsion devices, if present, may be deactivated) in order to perform a diagnostic routine a duration after the vehicle key-off event, as will be further described with respect to FIGS. 5 and 6. The control module may have a wake input that allows the control module to be returned to the awake mode based on an input received from one or more sensors. For example, the opening of a vehicle door may trigger a return to an awake mode. In other examples, the control module may be awoken in order to execute one or more afterrun tasks, including diagnostic and non-diagnostic features. In such an example, requesting features of the control module may set a timer via an alarm wake system following the vehicle key-off event before the control module enters the sleep mode such that the control module may be awoken to perform the one or more afterrun tasks before the vehicle is turned on, as further described herein. For example, when the timer elapses, a circuit may wake the control module to operate in an alarm wake mode. As one non-limiting example of a diagnostic feature that may be performed as an afterrun task, control module 302 may be configured to intermittently perform evaporative emissions system diagnostic routines to determine the presence or absence of undesired evaporative emissions in the evaporative emissions system and/or fuel system while the vehicle is off.

Next, FIG. 3 shows a block diagram of a first example of an alarm wake system 300 that may be included in a vehicle (e.g., vehicle 100 of FIGS. 1 and 2). Alarm wake system 300 includes a control module 302, which may be a powertrain control module (PCM), engine control module (ECM), transmission control module (TCM), etc., in communication with a body control module (BCM) 304, such as over a controller area network (CAN) 305. Control module 302 further includes requesting feature(s) 306, other features 308, a startup/shutdown controller 310, a wake manager (WAKEM) 312, and an interface 314.

Requesting feature(s) 306 include software features, such as executable instructions stored on a memory of the control module that may request a future wake-up time to perform their function (e.g., by generating the request based on current vehicle conditions and entry conditions and then sending the request to WAKEM 312). The requesting feature(s) may include both diagnostic and non-diagnostic features. For example, the diagnostic requesting features may include, but are not limited to, evaporative emissions system diagnostic and/or a NOx sensor diagnostic test, as will be further described with respect to FIG. 6. In another example, the non-diagnostic requesting features may include, but are not limited to, a low voltage setpoint manager for battery charging, vehicle-to-vehicle communication modules, and vehicle-to-infrastructure communication modules. The diagnostic requesting feature(s) may be features that include instructions stored in memory for performing diagnostic operations of the vehicle as well as components of the vehicle that perform the diagnostic operations according to the instructions (e.g., sensors and actuators, such as the sensors and actuators described with respect to FIGS. 1 and 2). The features may include instructions for reading sensor values, determining parameters related to the sensor values, and generating diagnostic indications and/or setting diagnostic codes stored in memory based on the determinations. As one example of the evaporative emissions system diagnostic as the diagnostic requesting feature, the evaporative emissions system diagnostic may include instructions stored in memory for determining a current engine coolant temperature (e.g., as measured by an engine coolant temperature sensor), determining a desired engine coolant temperature based on the current engine coolant temperature, generating an alarm wake up request based on the current engine coolant temperature and the desired engine coolant temperature, and sending the generated alarm wake up request to the WAKEM, as will be further described with respect to FIG. 5.

Other features 308 include features that may not request a future wake-up time. Startup/shutdown controller 310 maintains a power relay of control module 302, allowing control module 302 to sustain power independent of an ignition state of the vehicle (e.g., "on," in which the vehicle is powered and torque may be supplied to propel the vehicle responsive to driver demand, or "off," in which the vehicle is not powered may not be propelled by torque). Thus, startup/shutdown controller 310 controls the powering on and the powering off of control module 302 by switching the power relay of control module 302 into an "on" position (in which a power circuit is complete, enabling electrical energy to be supplied to control module 302) or an "off" position (in which the power circuit is broken, preventing electrical energy from being supplied to control module 302), respectively. Startup/shutdown controller 310 may be a controller startup/shutdown (CTSS) feature that includes instructions stored in memory for management of the starting and shutdown process of control module 302, for example. WAKEM 312 arbitrates and schedules alarm wake requests from the requesting features, as will be further described below with respect to FIG. 5. In the example of alarm wake system 300, an alarm wake up time determined by WAKEM 312 is set on a timer of BCM 304. Control module 302 may communicate with BCM 304 over CAN 305 via interface 314.

As shown in FIG. 3, requesting feature(s) 306 communicate bidirectionally with both startup/shutdown controller 310 and WAKEM 312. That is, requesting feature(s) 306 send signals to and receive signals from both startup/shutdown controller 310 and WAKEM 312. In contrast, other features 308 only send signals to startup/shutdown controller 310 and do not receive signals from startup/shutdown controller 310, at least within alarm wake system 300. Further, other features 308 do not communicate with WAKEM 312. WAKEM 312 also sends signals to and receives signals from both startup/shutdown controller 310 and interface 314. Interface 314 sends signals to but does not receive signals from startup/shutdown controller 310, at least within alarm wake system 300 (e.g., startup/shutdown controller 310 may send signals to interface 314 in other systems). As mentioned above, interface 314 (and thus control module 302) communicates bidirectionally with BCM 304 over CAN 305. The specific signals transmitted and received within alarm wake system 300 will be described with respect to FIGS. 5 and 6.

Next, FIG. 4 shows a block diagram of a second example of an alarm wake system 400. Components of FIGS. 3 and 4 that are numbered the same are functionally identical and may not be reintroduced. Alarm wake system 400 differs from alarm wake system 300 in that control module 302 includes a timer chip 316, and so the alarm wake up time determined by WAKEM 312 is set on timer chip 316. Since timer chip 316 is internal to the PCM, interface 314, BCM 304, and CAN 305 are not included in alarm wake system 400. As such, WAKEM 312 communicates directly with timer chip 316, both sending and receiving signals, and timer chip 316 sends signals to startup/shutdown controller 310. As for alarm wake system 300 of FIG. 3, the specific signals sent and received within alarm wake system 400 will be described below with respect to FIGS. 5 and 6.

Figure 5:
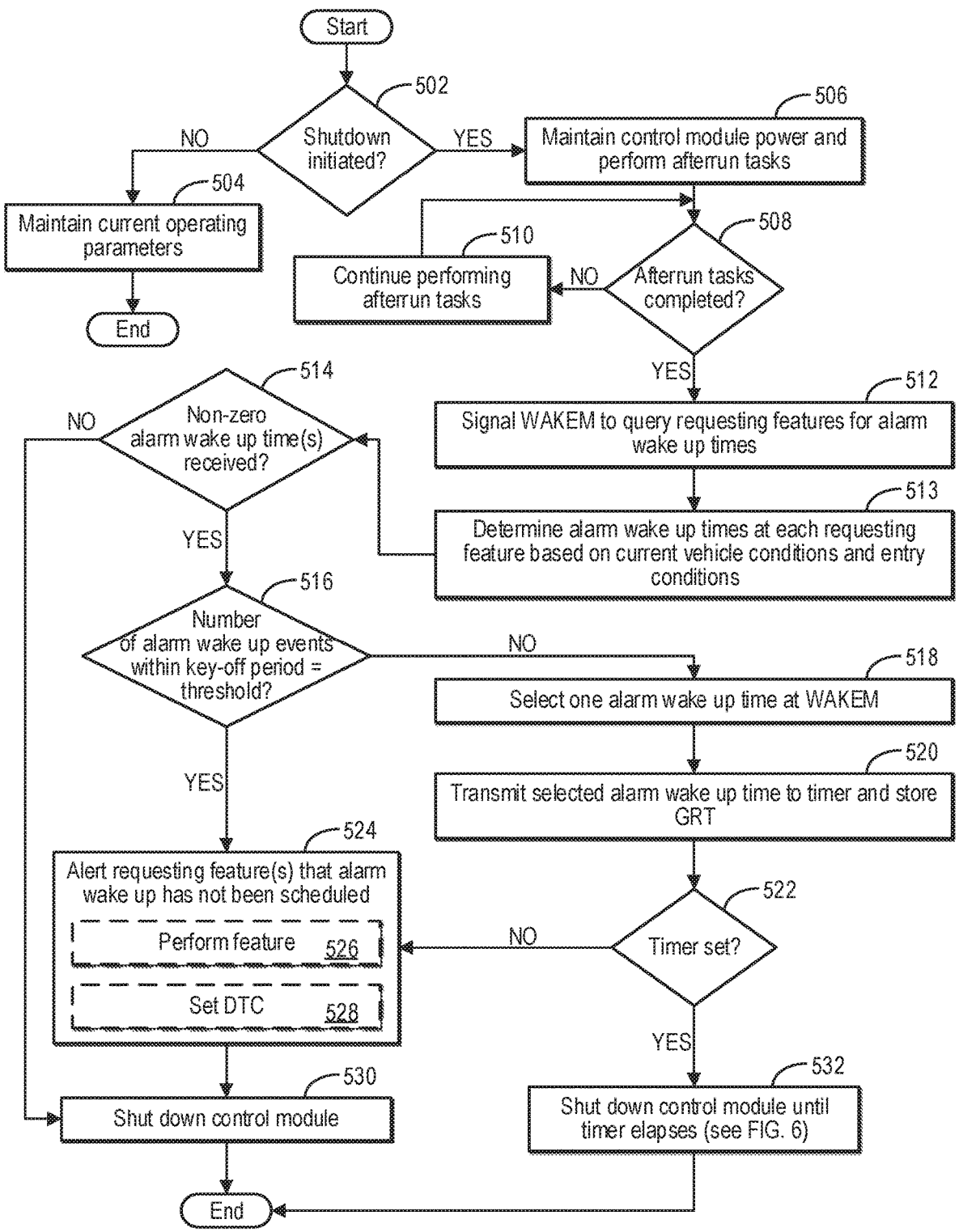
FIG. 5 shows a flowchart of an example method for setting a control module alarm wake up using an alarm wake system.

Turning first to FIG. 5, an example method 500 for requesting, arbitrating, and scheduling a control module alarm wake during a vehicle key-off period is shown. Method 500 will be described using the example vehicle system of FIGS. 1-2 and the example alarm wake systems of FIGS. 3 and 4, although it should be understood that other systems may be used without parting from the scope of this disclosure. For example, requesting feature(s) of a control module (e.g., requesting feature(s) 306 of control module 302 of FIGS. 3 and 4) may request an alarm wake during the vehicle key-off period in order to perform afterrun tasks a duration after the vehicle is shutdown. Instructions for carrying out method 500 and the rest of the methods included herein may be executed by a control system (e.g., control system 190 of FIGS. 1-4) based on instructions stored on one or more memories of the control system and in conjunction with signals received from sensors of the vehicle system, such as the sensors described above with reference to FIGS. 1-2. The control system may employ actuators of the vehicle system to adjust vehicle system operation according to the methods described below.

Method 500 begins at 502 and includes determining if a shutdown is initiated. As an example, a shutdown may be initiated in response to a vehicle ignition switch being moved to a key-off position. Moving the vehicle ignition switch to the key-off position, which may be referred to herein as a key-off event, may initiate a key-off period, with the key-off period lasting until the vehicle ignition switch is moved to a key-on position. In another example, a shutdown may be initiated in response to a completion of an alarm wake during the key-off period (and thus, is not initiated by the key-off event itself), as further described herein.

If a shutdown is not initiated, method 500 proceeds to 504 and includes maintaining current operating parameters. For example, if the ignition switch is in the key-on position, the vehicle will remain on, with power supplied to each control module of the control system of the vehicle. As another example, if operating in an alarm clock mode following an alarm clock wake, the control module may continue operating in the alarm clock mode. Following 504, method 500 ends.

If a shutdown is initiated, method 500 proceeds to 506 and includes maintaining control module power and performing afterrun tasks. For example, a startup/shutdown controller (e.g., startup/shutdown controller 310 of FIGS. 3 and 4) may maintain a power relay of the control module in an "on" position, enabling power (e.g., electrical energy) to be supplied to the control module from an energy storage device of the vehicle, such as energy storage device 150 of FIG. 1, for example. Further, once the shutdown is initiated, a CAN (e.g., CAN 305 of FIG. 3) may be switched to a listening mode so that other control modules that are not performing afterrun tasks may be kept off (or switched off after their afterrun tasks are completed). By not transmitting over the CAN, less electrical energy may be consumed. Afterrun tasks may include performing diagnostics, uploading vehicle data to the cloud, and downloading control strategies and calibrations from the cloud, for example. These afterrun tasks may be performed by features of the control module, such as other features 308 of FIGS. 3 and 4. However, other afterrun tasks may be performed some duration after the vehicle key-off event, when conditions may be more favorable, as will be further described below. These other afterrun tasks may be performed by requesting features of the control module that are approved to request an alarm wake for a later time in the vehicle key-off period.

At 508, it is determined if the afterrun tasks are complete. When complete, each feature may set a "run_done" flag at the startup/shutdown controller to indicate completion, for example. A requesting feature may also set a "run_done" flag at the startup/shutdown controller even if the requesting feature has not performed its task so that it may request an alarm wake using a callback function, as will be further described below. In some examples, such as when operating in the alarm wake mode, the "run_done" flags may remain set for the other (non-requesting) features upon waking. As such, during the alarm wake mode, only the "run_done" flags of the requesting features may be considered. Once the startup/shutdown controller has received "run_done" flags from every feature (both requesting features and other features), it may be determined that the afterrun tasks are complete. If not, method 500 proceeds to 510 and includes continuing to perform the afterrun tasks. In this way, the control module will not be shut down (e.g., the startup/shutdown controller will maintain the power relay of the control module) while the afterrun tasks are being performed, allowing the afterrun tasks to be completed.

Once the afterrun tasks are completed (e.g., the startup/shutdown controller receives "run_done" flags from every feature), method 500 proceeds to 512 and includes signaling a wake manager (WAKEM) to query requesting features for alarm wake up times. The WAKEM (e.g., WAKEM 312 of FIGS. 3 and 4) may query the requesting features and not the other (non-requesting) features, as the WAKEM may not be configured to transmit or receive signals from the other features. For example, with the "run_done" flags received from every feature, the startup/shutdown controller may transmit a signal to the WAKEM telling the WAKEM that all of the afterrun tasks are complete and it is preparing to shut down the control module. In response to receiving the signal from the startup/shutdown controller, the WAKEM may transmit signals to the requesting features asking for alarm wake up times (in minutes). For example, the WAKEM may signal the callback function of each requesting feature so that each requesting feature may determine whether to request an alarm wake (and the alarm wake up time of the requested alarm wake) instead of the WAKEM itself storing instructions to determine whether to request an alarm wake for each requesting feature. Further, since alarm wakes may be scheduled after shutdown is initiated, the WAKEM may not be active while the vehicle is on but may be activated in response to receiving the signal from the startup/shutdown controller.

At 513, method 500 includes determining an alarm wake up time at each requesting feature based on current vehicle conditions and entry conditions for the requesting feature. For example, each requesting feature may input current vehicle conditions into one or more look-up tables, algorithms, and/or maps, which may take into account the entry conditions for the requesting feature, and output a zero or non-zero alarm wake up time that is greater than a minimum alarm wake up time. The minimum alarm wake up time may be a calibratable amount of time, such as 10 minutes, below which it may be more favorable to maintain the control module powered on and perform the feature (such as by removing its "run_done" flag from the startup/shutdown controller) instead of shutting down the control module and waking it again.

As one example, a first requesting feature may determine not to request an alarm wake, such as when performing the first requesting feature is not indicated during the vehicle key-off period (e.g., based on a scheduling of the first requesting feature, the current vehicle conditions, expected vehicle conditions during the key-off period, the entry conditions for the first requesting feature, etc.). As such, the first requesting feature may determine an alarm wake up time of zero. For example, the first requesting feature may determine not to request an alarm wake when a state of charge of the energy storage device is less than a threshold state of charge. The threshold state of charge may be a non-zero amount of charge, such as a percentage of a total charge capacity, below which the energy storage device may not be able to support or execute the requesting feature upon waking the control module in the alarm clock mode. Thus, the threshold state of charge may serve as an entry condition for the first requesting feature, which is not met when the state of charge is less than the threshold state of charge.

As another example, a second requesting feature may use an algorithm to determine a non-zero alarm wake up time. For example, the second requesting feature may input a current ambient temperature, a current engine coolant temperature, and a desired engine coolant temperature (which may be an entry condition for the second requesting feature, for example) into the algorithm. The current ambient temperature may refer to an ambient temperature when the shutdown is initiated (e.g., at 502), as measured by an ambient temperature sensor (e.g., ambient temperature/humidity sensor 198 of FIG. 1). Similarly, the current engine coolant temperature may refer to an engine coolant temperature when the shutdown is initiated and may be measured by an engine coolant temperature sensor (e.g., engine coolant temperature sensor 216 of FIG. 2). For example, the desired engine coolant temperature may be within a threshold of the ambient temperature. The threshold may be a non-zero temperature difference, such as 10 degrees. Therefore, the second requesting feature may determine the desired engine coolant temperature based on the current ambient temperature and the threshold. The algorithm may use a temperature decay function, such as an exponential decay function, to determine an expected amount of time for the engine coolant temperature to reach the desired engine coolant temperature, which may be output as the alarm wake up time. For example, the exponential decay function may be: $ECT_{desired}=\alpha \times e^{(t/tc)}$ where $ECT_{desired}$ is the desired engine coolant temperature, $\alpha$ is a difference of the current engine coolant temperature and the current ambient coolant temperature, e is a mathematical constant that denotes an exponential function, t is time, and tc is a time constant determined from an empirical cooling curve and stored in a memory of the control module (e.g., in a look-up table). Further, in some examples, such as when the second requesting feature is an evaporative emissions system diagnostic, the exponential decay function may be multiplied by a fuel level normalizer (FLI): $ECT_{desired}=\alpha \times e^{(t/tc)} \times FLI$. The fuel level normalizer accounts for an influence of fuel level on a cooling rate of the fuel, as a more fuel (e.g., a higher fuel level) cools more slowly than less fuel (e.g., a lower fuel level). For example, the evaporative emissions system diagnostic may input a current fuel level (e.g., as measured by a fuel level sensor, such as fuel level sensor 282 of FIG. 2) into a look-up table and output the corresponding fuel level normalizer. Once the non-zero alarm wake up time is determined, each requesting feature may transmit its alarm wake up time to the WAKEM.

At 514, it is determined if at least one non-zero alarm wake up time is received at the WAKEM. If at least one non-zero alarm wake up time is not received, such as when each requesting feature determines and transmits an alarm wake up time of zero, method 500 proceeds to 530 and includes shutting down the control module. For example, the WAKEM will not set a timer to wake the control module and will transmit a signal to the startup/shutdown controller indicating that it has completed its task (such as by setting a "run_done" flag). In response to receiving the signal from the WAKEM, the startup/shutdown controller may switch the power relay of the control module to an "off" position such that power (e.g., electrical energy) is not supplied to the control module via the power relay and the control module enters a sleep mode. Following 530, method 500 ends.

If at least one non-zero alarm wake up time is received at the WAKEM, method 500 proceeds to 516 and includes determining if a number of alarm wakes performed within the key-off period is equal to a threshold. For example, shutdown may be initiated (e.g., at 502) after waking in the alarm clock mode, as will be further described with respect to FIG. 6. Therefore, one or more alarm wakes may have already been performed during the key-off period. An alarm wake counter may be kept in non-volatile memory, such as KAM, to track the number of times the control module has been woken up due to an alarm wake during the key-off period, for example. The alarm wake counter may be incremented each time the controller is woken due to an alarm wake during the key-off period and may be cleared (e.g., reset to zero) in response to a key-on event. The threshold may also be stored in the non-volatile memory and may be a calibratable, non-zero number of alarm wakes that may be allowed during the key-off period (e.g., per key-cycle). Since each alarm wake draws current from the energy storage device, alarm wakes above the threshold may lead to excessive current consumption. Further, in some examples, the energy storage device may not be charged during the key-off period, which may last a relatively short duration (e.g., hours) or a relatively long duration (e.g., weeks). If the key-off period lasts a relatively long duration and the number of alarm wakes is not limited to the threshold, a state of charge of the energy storage device may not be able to sustain a starting operation of the vehicle upon a key-on event, for example. Therefore, the threshold may reduce the number of alarm wakes in order to limit an amount of current consumed between key-on events. In a non-limiting example, the threshold may be three alarm wakes per key-off period.

If the number of alarm wakes that have been performed within the key-off period is not equal to the threshold (e.g., the number of alarm wakes is less than the threshold), method 500 proceeds to 518 and includes selecting one alarm wake up time at the WAKEM. For example, the WAKEM may compare each of the non-zero alarm wake up times received from the one or more requesting features to determine which alarm wake up to select based on a common feature of the received alarm wake up times. For example, the common feature may be a time, such as an amount of time before the requested alarm wake (e.g., shortest or longest), an absolute time, a relative time, a duration of the requested alarm wake (e.g., a request for a 5 minute wake up event), or a time of day of the requested alarm wake. As one example, the WAKEM may select the shortest (e.g., earliest) alarm wake up time (e.g., in minutes).

At 520, method 500 includes transmitting the selected alarm wake up time to a timer and storing the current global real time (GRT). In one example, the timer is an internal timer chip of the control module, such as shown in alarm wake system 400 of FIG. 4. The WAKEM may directly transmit the selected alarm wake up time to the internal timer chip. In another example, the timer is included in a BCM, such as shown in alarm wake system 300 of FIG. 3. The WAKEM may transmit the selected alarm wake up time to an interface of the control module (e.g., interface 314 of FIG. 3), which may then transmit the selected alarm wake up time to the BCM over the CAN. As soon as received, the timer may be set for the selected alarm wake up time and begin a countdown (or begin counting up from zero to the selected alarm wake up time) so that the beginning of the countdown occurs at the stored GRT. The stored GRT may be stored in a non-volatile memory of the control module, for example, and may be used upon waking for alarm wake system diagnostics, as will be described with respect to FIG. 6. Further, the timer may be an "always on" component that remains operational regardless of the power-up or power-down state of the control module.

At 522, it is determined if the timer is set. For example, determining if the timer is set may include determining if the WAKEM has received an acknowledgement of the selected alarm wake up time from the timer. If the timer is an internal timer chip, once the selected alarm wake up time is received and set, the timer may transmit the acknowledgement of the selected alarm wake up time directly to the WAKEM, such as by echoing the selected alarm wake up time. If the timer is included in the BCM, the interface may read a BCM timer status over the CAN and transmit the BCM timer status to the WAKEM as the acknowledgement.

If the WAKEM does not receive the acknowledgement of the selected alarm wake up time from the timer, it may be determined that the timer is not set, and method 500 proceeds to 524. At 524, method 500 includes alerting the requesting feature(s) that the alarm wake has not been scheduled. Each of the requesting feature(s) that requested a non-zero alarm wake up time may then decide whether to perform the feature, as indicated at 526. For example, each of the requesting feature(s) may clear its "run_done" flag at the startup/shutdown controller to keep the control module from shutting down while it determines whether to perform the feature, such as by requesting an afterrun latch at the startup/shutdown controller to hold the control module power relay circuit closed, thereby maintaining the control module powered on. Determining whether to perform the feature may include determining whether entry conditions for the feature are met, such as by comparing current vehicle conditions to the entry conditions. Each of the requesting feature(s) may continue to compare the current vehicle conditions to its entry conditions while the startup/shutdown controller maintains the control module powered on. As an example, when the requesting feature is the evaporative emissions system diagnostic, the evaporative emissions system diagnostic may continue to compare the engine coolant temperature against the ambient temperature to determine if the engine coolant temperature is within the threshold (as defined above at 513) while holding the control module powered on via the afterrun latch at the startup/shutdown controller. The evaporative emissions system diagnostic may then be executed in response to the entry conditions being met, as will be further described with respect to 634 of FIG. 6. Therefore, performing the feature at 526 includes operating with the entry conditions for the corresponding requesting feature met, the requesting feature making a determination that the entry conditions are met (e.g., based on sensor output), and executing the feature (e.g., based on signals sent to actuators of the vehicle).

If the requesting feature determines not to perform the feature, such as when entry conditions are not met, the feature may optionally set a diagnostic trouble code (DTC) indicating that the feature could not be performed, as indicated at 528. For example, the requesting feature may determine not to perform the feature when the battery state of charge drops below the threshold state of charge (e.g., as defined at 513) while holding the control module powered on and monitoring current vehicle conditions against its entry conditions. As one example, the requesting feature may set the DTC every time it is not able to perform (or complete) the feature. As another example, the requesting feature may set the DTC after a calibratable number of attempts over which it has not been able to perform the feature. For example, each time the requesting feature unsuccessfully attempts to perform the feature, it may increment a counter and set the DTC once the counter reaches the calibratable number. The counter may be reset once the feature is performed. After performing the feature, setting the diagnostic code, or logging the attempt, each requesting feature may reset its "run_done" flag at the startup/shutdown controller to indicate completion. Method 500 may then proceed to 530 to shut down the control module, as described above.

Returning to 516, if the number of alarm wakes that have been performed with the key-off period is equal to the threshold, method 500 proceeds to 524 and includes alerting the requesting feature(s) that the alarm wake has not been scheduled, as described above. Thus, each requesting feature may determine whether to perform its feature before the control module is shut down and not woken via an alarm wake.

Returning to 522, if it is determined that the timer is set, such as by the WAKEM receiving the acknowledgment of the selected alarm wake up time from the timer, method 500 proceeds to 532 and includes shutting down the control module until the timer elapses. For example, the control module may be shut down, as described at 530, and maintained in the sleep mode until the timer elapses. When the timer elapses (e.g., the timer countdown or count up reaches zero), the control module may be woken in the alarm clock mode, as will be described with respect to FIG. 6. Following 532, method 500 ends.

Figure 6:
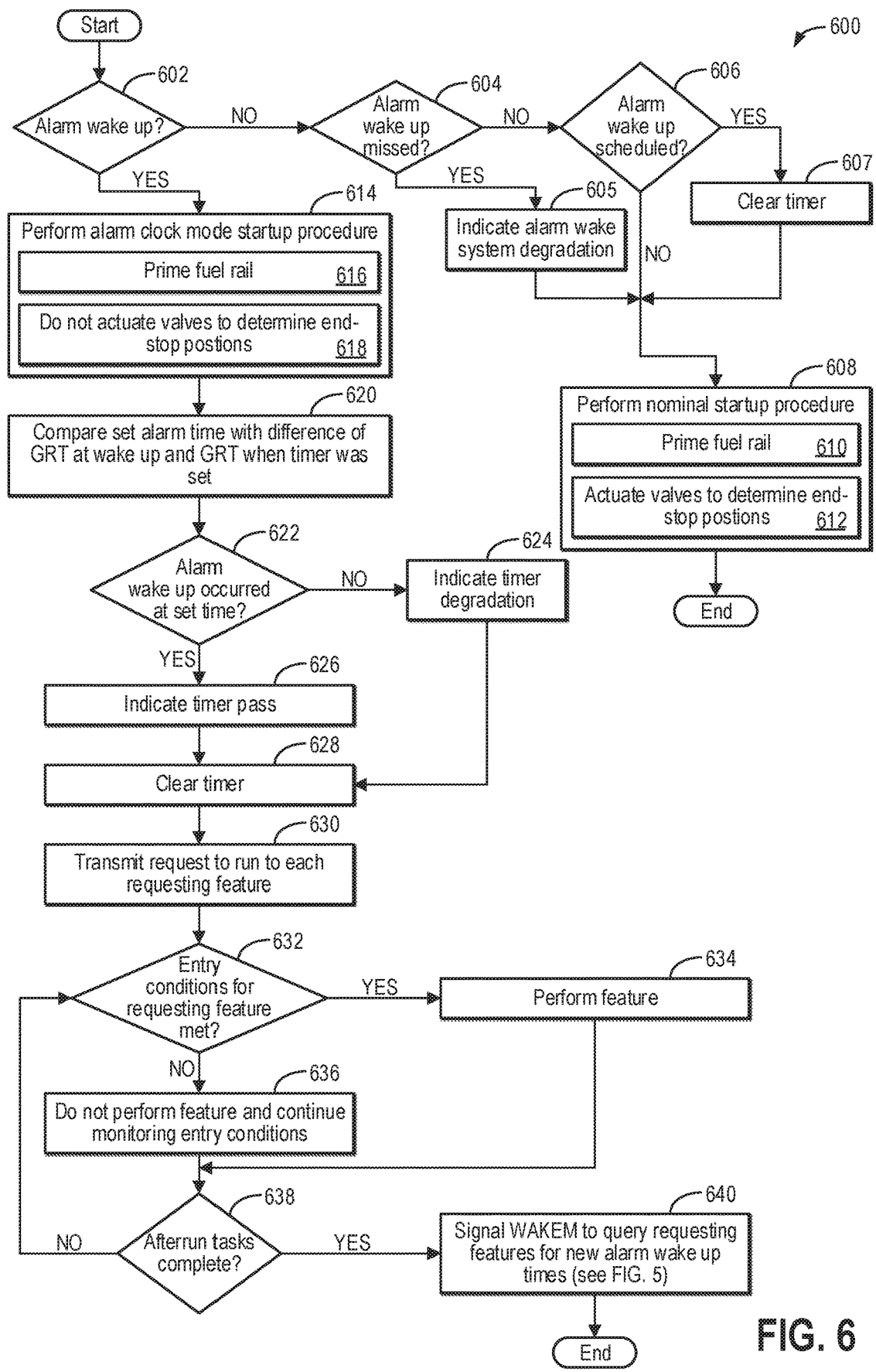
FIG. 6 shows a flowchart of an example method for operating a control module in an alarm wake mode in response to an alarm wake up or in a nominal mode in response to a non-alarm wake up.
Figure 7:
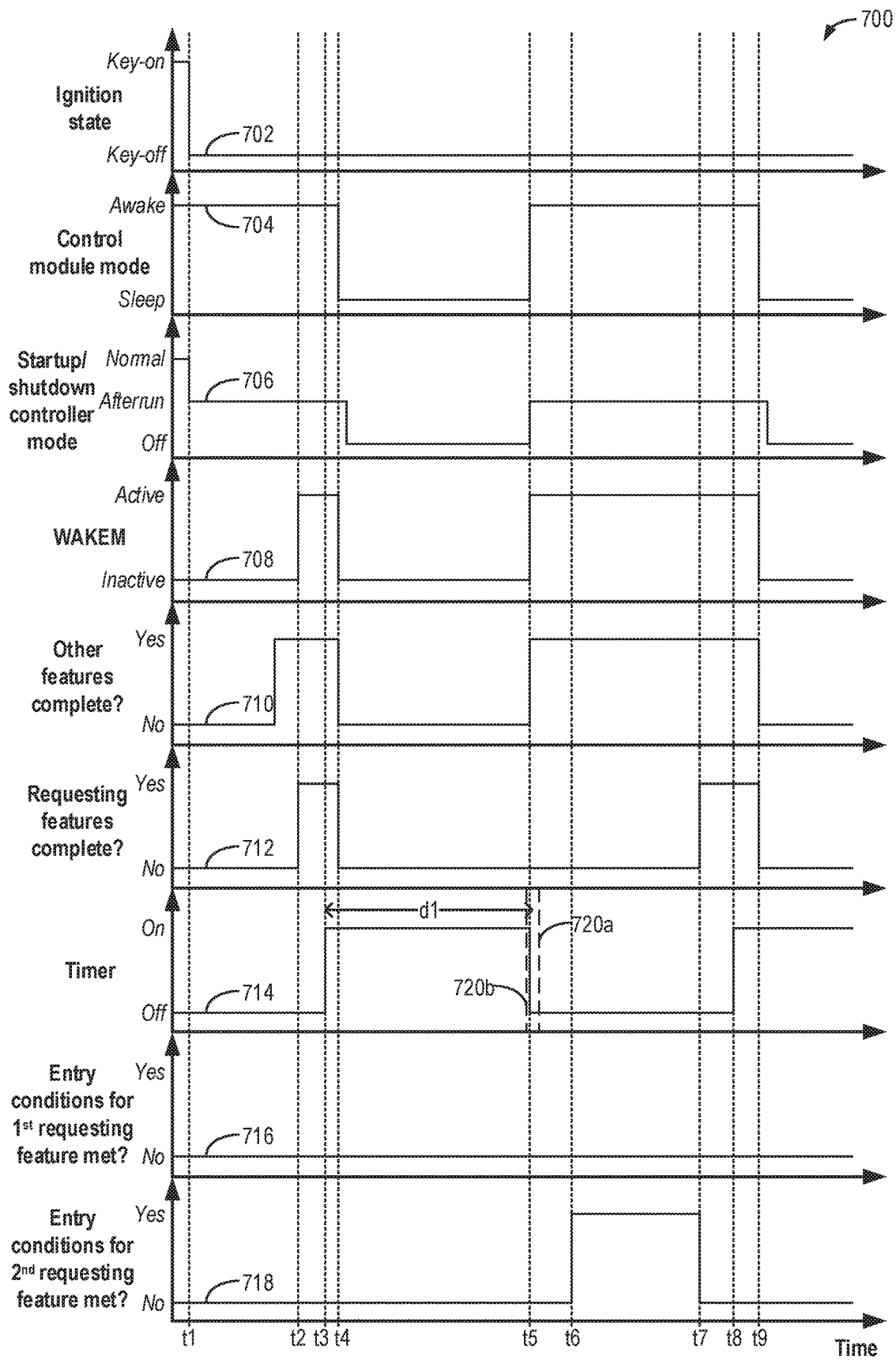
FIG. 7 depicts a prophetic example of setting a timer to wake a control module during a vehicle key-off period via an alarm wake system and waking the control module when the timer elapses.

Next, FIG. 6 shows an example method 600 for waking a vehicle control module (e.g., control module 302 of FIGS. 2-4), such as a PCM, in an alarm clock mode during a vehicle key-off period responsive to an alarm wake up or in a nominal mode responsive to a non-alarm wake up. For example, the vehicle control module may be configured with an alarm wake system (e.g., alarm wake system 300 of FIG. 3 or alarm wake system 400 of FIG. 4) for setting a timer in order to wake the control module during the vehicle key-off period to perform afterrun tasks. As described with respect to FIG. 5, the alarm wake may be requested by one or more requesting features (e.g., requesting feature(s) 306 of FIGS. 3 and 4) and scheduled via a WAKEM (e.g., WAKEM 312 of FIGS. 3 and 4). Upon waking, the control module may perform a different set of actions based on whether it is an alarm wake up or a non-alarm wake up, as described below.

Further, the control module may perform diagnostics to determine whether the alarm wake system is functioning nominally.

Method 600 begins at 602 and includes determining if an alarm wake up is present. The alarm wake up may be present if the control module is woken in response to the timer elapsing (e.g., by counting up or counting down to a set alarm wake up time). The timer may be an internal timer chip of the control module, such as shown in alarm wake system 400 of FIG. 4 (e.g., timer chip 316), or may be included in a BCM, such as shown in alarm wake system 300 of FIG. 3 (e.g., BCM 304). For example, when the timer elapses, a signal may be sent from the timer to a startup/shutdown controller (e.g., startup/shutdown controller 310 of FIGS. 3 and 4). The signal may further include a wake reason (e.g., an alarm wake up versus a non-alarm wake up). If the timer is the internal timer chip, the timer chip may communicate directly with the startup/shutdown controller. If the timer is included in the BCM, the BCM may trigger a hardwire wake line to the control module and communicate the wake reason over a CAN (e.g., CAN 305 of FIG. 3). The wake reason may be received from the CAN by an interface of the control module (e.g., interface 314 of FIG. 3), which may then communicate the wake reason to the startup/shutdown controller. The alarm wake up may not be present when a non-alarm wake up is present, such as when the control module is woken by an input that is not the timer elapsing. For example, a non-alarm wake up may be triggered by an opening of a vehicle door, a brake pedal being depressed, or a key-on event (such as via ignition key insertion, a key fob insertion, a remote start button being depressed, or an ignition switch being in any position other than "off"). The startup/shutdown controller may communicate the wake reason to the requesting features and/or the wake manager.

If an alarm wake up is not present, the control module may be operated in the nominal mode, and method 600 proceeds to 604 and includes determining if an alarm wake up was missed. For example, it may be determined that the alarm wake up was missed if an alarm wake up time was set (e.g., according to method 500 of FIG. 5), the timer elapsed, and the control module was not woken responsive to the timer elapsing, such as based on an elapsed time at wake up (e.g., a difference of a GRT at wake up and a GRT stored when the timer was set, as further described below at 620) and the set alarm wake up time. For example, timer degradation may result in the missed alarm wake up, such as due to the timer resetting or counting down too slowly. As another example, the alarm wake up may be missed if a higher priority wake up (e.g., due to a key-on event) is active while the timer elapses. As still another example, if the timer is included in a BCM (e.g., as shown for alarm wake system 300 of FIG. 3), the alarm wake up may be missed due to a circuit fault on a BCM-controlled hardwired wake line or a power loss to the BCM that results in the timer losing an ability to clock the elapsed time.

If an alarm wake up was missed, method 600 proceeds to 605 and includes indicating alarm wake system degradation. Indicating alarm wake system degradation may include setting a corresponding diagnostic trouble code (DTC) in a memory of the control module. Indicating alarm wake system degradation may further include illuminating a malfunction indicator lamp (MIL), such as on a dash of the vehicle (e.g., in vehicle instrument panel 196 of FIG. 1), to alert a vehicle operator to service the vehicle. Method 600 may then proceed to 608 and perform a nominal startup procedure. The nominal startup procedure may include priming a fuel rail of the vehicle, as indicated at 610, and actuating valves of the vehicle to determine end-stop positions, as indicated at 612. For example, priming the fuel rail (e.g., fuel rail 267 of FIG. 2) may include actuating a fuel pump (e.g., fuel pump 234 of FIG. 2) to deliver fuel from a fuel tank (e.g., fuel tank 144 of FIGS. 1 and 2) to the fuel rail until fuel within the fuel rail is at or above a threshold pressure and the fuel rail has been purged of air. Further, priming the fuel rail may include not actuating fuel injectors (e.g., fuel injector 266 of FIG. 2) so that fuel is not delivered to engine cylinders. By priming the fuel rail, the fuel injectors may be poised to deliver pressurized fuel during a starting operating of the engine. Actuating the valves of the vehicle to determine end-stop positions may include sending a control signal to each valve to command each valve fully closed and/or fully open and receiving feedback concerning the position of each valve, such as via a corresponding position sensor. For example, the end-stop positions of some valves may vary in response to temperature and other conditions. By determining the end-stop positions during startup, the valves may be more accurately controlled while the vehicle is driven. As an example, a throttle (e.g., throttle 262 of FIG. 2) may be commanded to a first end-stop position, such as a fully closed position, and the position measured by a throttle position sensor. The control module may compare the measured first end-stop position to the commanded position and adjust a gain of the throttle position sensor if the commanded position differs from the measured position (e.g., by a threshold), for example. The process may then be repeated for a second end-stop position, such as a fully open position.

Returning to 604, if an alarm wake up has not been missed, method 600 proceeds to 606 and includes determining if an alarm wake up is scheduled. For example, it may be determined that an alarm wake up is scheduled if the alarm wake system scheduled an alarm wake up (e.g., according to method 500 of FIG. 5) and a non-zero amount of time remains on the timer. If an alarm wake up is scheduled, method 600 proceeds to 607 and includes clearing the timer. By clearing the timer, the timer may be set for a new alarm wake up time upon a subsequent control module shutdown in response to one or more requesting features requesting a non-zero alarm wake up time. Method 600 proceeds to 608 and includes performing the nominal startup procedure, as described above.

Returning to 606, if an alarm wake up is not scheduled, method 600 proceeds 608 and includes performing the nominal startup procedure, as described above. Thus, the nominal startup procedure will be performed whenever the control module is woken in response to a non-alarm wake up, whether or not an alarm wake up has been scheduled and/or missed. Following 608, method 600 ends.

Returning to 602, if an alarm wake up is present, such as responsive to the timer elapsing, the control module may be operated in the alarm clock mode, and method 600 proceeds to 614 and includes performing an alarm clock mode startup procedure. The alarm clock mode startup procedure may include priming the fuel rail, as indicated at 616, and not actuating the valves to determine the end-stop positions, as indicated at 618. By priming the fuel rail, as described at 610, the vehicle may be prepared for ignition should the ignition state of the vehicle change while in the alarm clock mode. By not actuating the valves to determine the end-stop positions, energy is conserved should the ignition state of the vehicle not change while in the alarm clock mode.

At 620, method 600 includes comparing the set alarm wake up time with a difference of the GRT at wake up and the GRT when the timer was set. For example, the WAKEM may perform a timer accuracy check during every alarm clock wake by comparing the set alarm wake up time (e.g., an amount of time in minutes) with an amount (e.g., duration) of time that has elapsed, which may be equal to the difference of the GRT at wake up and the GRT stored when the timer was set (e.g., in minutes).

At 622, it is determined if the alarm wake up occurred at the set alarm wake up time. For example, it may be determined that the alarm wake occurred at the set alarm wake up time if the amount of time that has elapsed is within a threshold range, the threshold range centered at the set alarm wake up time. The threshold range may be a non-zero amount of time that corresponds to a tolerance limit of the timer. The tolerance limit may refer to a maximum amount of time that an actual wake up time (e.g., the amount of time that has elapsed) may differ (in a positive or negative direction) from the set alarm wake up time and still be considered to have occurred as requested. For example, the threshold range may be defined by a first, higher threshold and a second, lower threshold, the first, higher threshold set at an amount of time greater than the set alarm wake up time and the second, lower threshold set at the amount of time less than the set alarm wake up time.

If the alarm wake did not occur at the set alarm wake up time (e.g., the amount of time that has elapsed is not within the threshold range), method 600 proceeds to 624 and includes indicating timer degradation. In one example, the timer may be counting down too quickly, leading to the amount of time that has elapsed being less than the second, lower threshold. In another example, the timer may be counting down too slowly, leading to the amount of time that has elapsed being greater than the first, higher threshold. Indicating timer degradation may include setting a corresponding DTC in a memory of the control module. Indicating timer degradation may further include illuminating a MIL, such as on a dash of the vehicle, to alert a vehicle operator to service the vehicle.

If the alarm wake occurred at the set alarm wake up time (e.g., the amount of time that has elapsed is within the threshold range), method 600 proceeds to 626 and includes indicating a timer pass. The indication of the timer pass may be stored in a memory of the control module, for example.

At 628, method 600 includes clearing the timer. For example, after the timer accuracy check is performed, it may not be beneficial to save the timer value for the current alarm wake. By clearing the timer, the timer may be set for a new alarm wake up time upon a subsequent control module shutdown in response to one or more requesting features requesting a non-zero alarm wake up time.

At 630, method 600 includes transmitting a request to run to each of the requesting features. For example, the startup/shutdown controller may transmit the request to run to the requesting features when it transmits the wake reason (e.g., an alarm wake up). Upon receiving the request to run, each requesting feature may begin evaluating its entry conditions. For example, each requesting feature of the one or more requesting may evaluate its entry conditions independently of the other requesting features and regardless of whether or not its requested alarm wake up time was the set alarm wake up time (e.g., as selected by the WAKEM at 518 of FIG. 5). As described above, the requesting features may include diagnostic and non-diagnostic features. As a first example, entry conditions for an engine-off evaporative emissions system diagnostic test may include an engine coolant temperature being less than a threshold engine coolant temperature and a fuel tank pressure (such as measured by FTPT 217 of FIG. 1) being less than a threshold pressure. For example, the threshold engine coolant temperature may be a non-zero temperature value that indicates the engine is not warm, and the threshold pressure may be a non-zero pressure value that indicates the fuel tank is not substantially pressurized. As a second example, entry conditions for a NOx sensor diagnostic test may include an exhaust temperature (e.g., as measured by exhaust temperature sensor 232 of FIG. 2) being less than a threshold exhaust temperature and an oxygen concentration (e.g., as measured by exhaust gas sensor 226 of FIG. 2) being within a threshold range. In some examples, the threshold exhaust temperature and the threshold range may be determined based on ambient conditions such that when the exhaust temperature is less than the threshold exhaust temperature and the oxygen concentration is within the threshold range, it may be determined that an exhaust system of the vehicle (e.g., exhaust system 225 of FIG. 2) is at ambient conditions. The entry conditions for the NOx sensor diagnostic test may further include an ambient pressure being within a threshold pressure range and an ambient temperature being within a threshold temperature range. As a third example, entry conditions for a low voltage setpoint manager for maintaining a charge of a low voltage battery (e.g., a 12 V battery) may include a voltage of the low voltage battery being less than a threshold voltage. The threshold voltage may refer to a non-zero voltage value below which the low voltage battery may not be able to provide adequate electric energy to various vehicle loads (e.g., vehicle lights, vehicle heating and cooling systems). When the vehicle is a PHEV, entry conditions for the low voltage setpoint manager may further the vehicle being disconnected from an external power source for a threshold duration. The threshold duration may refer to a non-zero time duration, such as when the vehicle has not been operated (e.g., keyed on) for a prolonged period (e.g., days or weeks).

At 632, it is determined if entry conditions for a requesting feature are met. For example, each requesting feature of the one or more requesting features may independently determine if its entry conditions are met by comparing current vehicle conditions (e.g., as measured by one or more sensors or inferred based on available data) with its entry conditions.

If the entry conditions for the requesting feature are met, method 600 proceeds to 634 and includes performing the feature. As a first example, if entry conditions for the engine-off evaporative emissions system diagnostic test are met (e.g., the engine coolant temperature is less than the threshold engine coolant temperature and the fuel tank pressure is less than the threshold pressure), the engine-off evaporative emissions system diagnostic test may be performed. Performing the engine-off evaporative emissions system diagnostic test may include commanding closed a canister vent valve (e.g., canister vent valve 214 of FIG. 2) to seal the evaporative emissions system and fuel system and monitoring the fuel tank pressure for a duration. As a second example, if entry conditions for the NOx sensor diagnostic test are met (e.g., the exhaust temperature is less than the threshold exhaust temperature and the oxygen concentration is within the threshold range), the NOx sensor diagnostic test may be performed. The NOx sensor diagnostic test may include controlling current/voltage within the NOx sensor, measuring NOx with the NOx sensor, and comparing the measured NOx to a stored reference value. The requesting features may be performed in parallel (e.g., simultaneously) or in series (e.g., one after another). After performing each requesting feature, the requesting feature may set its "run- _done" flag at the startup/shutdown controller to indicate that its task is complete. Further, while not explicitly illustrated, if a non-alarm wake occurs at any point while the control module is operating in the alarm clock mode, the control module may be transitioned to the nominal mode and perform the nominal startup procedure. If any requesting features are performing their tasks at that time, they may determine whether to finish their tasks or abort their tasks and reschedule based on current vehicle conditions and their entry conditions.

If the entry conditions for the requesting feature are not met, method 600 proceeds to 636 and includes not performing the feature and continuing to monitor the entry conditions. In one example, a requesting feature may set its "run_done" flag at the startup/shutdown controller while continuing to monitor its entry conditions. In this way, it may continue to monitor its entry conditions while other features are performing their tasks. By setting the "run_done" flag, the feature may not continue to monitor entry conditions indefinitely, preventing the control module from shutting down again and draining an energy storage device of the vehicle, and a maximum duration for monitoring entry conditions need not be defined.

At 638, it is determined if the afterrun tasks are complete. Each feature of the one or more requesting features may set a "run_done" flag at the startup/shutdown controller to indicate completion, for example, or may set a "run_done" flag while continuing to monitor entry conditions, as described above. While operating in the alarm wake mode, only the "run_done" flags of the requesting features may be considered, as "run_done" flags of other (e.g., non-requesting) features may remain set or be set immediately upon waking in the alarm clock mode. Further, upon waking, a requesting feature that did not request a non-zero alarm wake up time may immediately set its "run_done" flag at the startup/shutdown controller. Once the startup/shutdown controller has received "run_done" flags from all of the requesting features, it may be determined that the afterrun tasks are complete. If not, method 600 returns to 632 and includes determining if entry conditions for a requesting feature are met. In this way, the control module will not be shut down (e.g., the startup/shutdown controller will maintain the power relay of the control module) while the afterrun tasks are being performed, allowing the afterrun tasks to be completed.

If the afterrun tasks are complete, method 600 proceeds to 640 and includes signaling the WAKEM to query the requesting features for new alarm wake up times, as described with respect to FIG. 5. For example, with the "run_done" flags received from every requesting feature, the startup/shutdown controller may transmit a signal to the WAKEM telling the WAKEM that all of the afterrun tasks are complete and it is preparing to shut down the control module. In response to receiving the signal from the startup/shutdown controller, the WAKEM may transmit signals to the requesting features asking for alarm wake up times (in minutes). In this way, the WAKEM may query the requesting features for alarm wake requests during every control module shutdown event. For example, the requesting features whose entry conditions were not met may request a new alarm wake up time in order to perform their tasks when conditions are more optimal during the vehicle key-off period. As an illustrative example, if a first requesting feature had requested an alarm wake for 300 minutes and a second requesting feature had requested an alarm wake for 90 minutes, the timer may have been set for 90 minutes (e.g., at 520 of method 500 of FIG. 5). Upon the control module waking after 90 minutes, the entry conditions for the first requesting feature may not be met (e.g., at 632). Therefore, the first requesting feature may request a new alarm wake up time. Following 640, method 600 ends.

In this way, the requesting feature(s) may perform their respective tasks when their respective entry conditions are met, thereby avoiding suboptimal conditions and increasing system robustness. If a requesting feature is a diagnostic routine, avoiding suboptimal conditions may reduce an occurrence of false fault detections, for example.

Thus, in one example, the method may include determining an alarm wake up and in response thereto, performing an alarm clock mode startup procedure and sending a request to run to requesting features; and determining a non-alarm wake up (which may be not an alarm wake up) and in response thereto, performing a nominal startup procedure and not sending the request to run to the requesting features. As an example, the nominal startup procedure includes priming a fuel rail of a fuel system of a vehicle and determining end-stop positions of valves of the vehicle, and the alarm clock mode startup procedure includes priming the fuel rail and not determining the end-stop positions of the valves. In some examples, priming the fuel rail occurs while or during the alarm clock mode startup procedure as well as while or during the nominal startup procedure. Further, in some examples, determining end-stop positions of the valves occurs while or during the nominal startup procedure and while the alarm wake up is not present. In some examples, sending the request to run to the requesting features occurs while or during the alarm clock mode startup procedure and/or while the non-alarm wake up is not present.

Further, instructions stored in memory of a control module may include determining an alarm wake up in response to a timer elapsing and triggering a wake line of the control module and determining a non-alarm wake up in response to a door ajar signal, a remote start signal, or an ignition switch signal. For example, instructions stored on memory may include differentiating between the alarm wake up and the non-alarm wake up based on whether or not the timer has triggered the wake line of the control module and in response to the differentiating, performing one or more of priming the fuel rail, sending a request to run to the requesting features, and actuating valves to determine end-stop positions. In response to the alarm wake up or the non-alarm wake up, the control module may prime the fuel rail by instructions for sending a signal to a fuel pump of the fuel system. In response to the alarm wake up and not to the non-alarm wake up, the control module may transmit the request to run to the requesting features by instructions stored in memory for sending a signal to each of the requesting features. In response to the non-alarm wake up and not to the alarm wake up, the control module may determine valve end-stop positions by instructions for sending respective signals to valves of the vehicle. As an example, the control module may include instructions for sending a signal to a throttle to actuate the throttle to a first end-stop position, receive a signal from a throttle position sensor regarding the position of the throttle while at the first end-stop position, actuate the throttle to a second end-stop position, and receive a signal from the throttle position sensor regarding the position of the throttle while at the second end-stop position. In some examples, the method may include determining whether to perform one or more of each of priming the fuel rail, determining the end-stop positions of the valves, and sending a request to run to the requesting features based on a determination of whether the alarm wake up is present and a determination of whether the non-alarm wake up is present. At any control module wake up, one of the alarm wake up and the non-alarm wake up must be present.

As illustrated by examples herein, the method of operating and performing actions responsive to a determination of the alarm wake up may include operating in the alarm clock mode (e.g., with the control module on and the vehicle off), determining whether that condition is present (such as based on the timer elapsing and triggering the wake line of the control module) and performing actions in response thereto, as well as operating without the alarm wake up present, determining that the alarm wake up is not present, and performing a different action in response thereto. For example, in response to the alarm wake up and while operating in the alarm clock mode, the method may include performing the alarm clock mode startup procedure and transmitting the request to run to the requesting features. In response to a non-alarm wake up and while operating in the nominal mode, the method may include performing the nominal startup procedure and not transmitting the request to run to the requesting features.

Turning now to FIG. 7, an example timeline 700 for setting a timer to wake a control module of a vehicle (e.g., control module 302 of FIGS. 3 and 4) during a key-off period in order to perform one or more afterrun tasks is shown. For example, the timer may be set using an alarm wake system, such as alarm wake system 300 of FIG. 3 or alarm wake system 400 of FIG. 2, including a WAKEM (e.g., WAKEM 312 of FIGS. 3 and 4) and a startup/shutdown controller (e.g., startup/shutdown controller 310 of FIGS. 3 and 4). An ignition state of the vehicle is shown in plot 702, a mode of the control module is shown in plot 704, a mode of the startup/shutdown controller is shown in plot 706, a state of the WAKEM is shown in plot 708, an indication of other features being complete shown in plot 710, an indication of requesting features being complete is shown in plot 712, a state of the timer is shown in plot 714, an indication of entry conditions for a first requesting feature being met is shown in plot 716, and an indication of entry conditions for a second requesting feature being met is shown in plot 718.

For all of the above, the horizontal axis represents time, with time increasing along the horizontal axis from left to right. The vertical axis represents each labeled parameter. For plot 702, the vertical axis represents whether the ignition is in a "key-on" or a "key-off" position. For plot 704, the vertical axis represents whether the control module is in an awake mode, in which a larger amount of electrical energy is consumed by the control module, or a sleep mode, in which a smaller amount of electrical energy is consumed by the control module. For plot 706, the vertical axis represents whether the startup/shutdown controller is in a normal operating mode (e.g., while the vehicle is on, such as when the ignition switch is in the key-on position), an afterrun operating mode (e.g., in which the startup/shutdown controller maintains the power relay of the control module while features of the control module perform afterrun tasks while the ignition switch is in the key-off position), or off (e.g., after shutting down the control module and while the ignition switch is in the key-off position). For plot 708, the vertical axis represents whether the WAKEM is "active" (e.g., transmitting and receiving signals) or "inactive" (e.g., not transmitting or receiving signals). For plots 710 and 712, the vertical axis represents whether completion of the other features and the requesting features, respectively, is indicated ("yes" or "no"). Further, in the example of timeline 700, "other features" may refer to one or more features that may not request an alarm wake, and the indication of completion may refer to "run_done" flags for all of the one or more other features being set, although each of the one or more other features may individually set its "run_done" flag. Similarly, "requesting features" may refer to one or more features that may request an alarm wake, and the indication of completion may refer to "run_done" flags for all of the one or more requesting features being set, although each of the one or more requesting features may individually set its "run_done" flag. For plot 714, the vertical axis represents whether the timer is "on" (e.g., set for a non-zero alarm wake up time) or "off" (e.g., not set for a non-zero alarm wake up time). For plots 716 and 718, the vertical axis represents whether entry conditions for a first requesting feature and a second requesting feature, respectively are met ("yes") or not met ("no"). Although two requesting features are shown in the example of timeline 700, other examples may have more or fewer requesting features.

Prior to time t1, the vehicle is on, with the ignition in the key-on position (plot 702). With the vehicle on, the control module is in the awake state (plot 704), and the startup/shutdown controller is in the normal operating mode (plot 706). Furthermore, with the vehicle on, the WAKEM is inactive (plot 708), and the timer is off (plot 714).

At time t1, the ignition is switched to the key-off position (plot 702). In response to the key-off event, the startup/shutdown controller is transitioned to the afterrun mode (plot 706) in order to maintain a power relay of the control module to maintain the control module in the awake mode (plot 704). Additionally, the other features (e.g., other features 308 of FIGS. 3 and 4) and the requesting features (e.g., requesting feature(s) 306 of FIGS. 3 and 4) begin performing their afterrun tasks. The other features finish their afterrun tasks between time t1 and time t2, and thus, all of the "run_done" flags are set (e.g., at the startup/shutdown controller) between time t1 and time t2, as shown by the indication that the other features are complete between time t1 and time t2 (plot 710). The entry conditions for the first requesting feature (plot 716) and the second requesting feature (plot 718) are not met. Therefore, the first requesting feature and the second requesting feature are not performed, but both the first requesting feature and the second requesting feature set their "run_done" flags so that they may request an alarm wake (e.g., using a callback function). At time t2, all of the "run_done" flags for the requesting features are set, and so the requesting features are indicated to be complete (plot 712).

At time t2, in response to the other features and the requesting features indicating completion (e.g., all of the "run_done" flags being set), the WAKEM is activated (plot 708). For example, the WAKEM may be activated in response to a signal from the startup/shutdown controller. While active, the WAKEM queries the requesting features for alarm wake up times. After receiving the alarm wake up times from the requesting features, the WAKEM selects an alarm wake up time based on a common feature of the alarm wake up times, such as based on an amount of time requested, and at time t3, sets the timer for the selected alarm wake up time. For example, the WAKEM may set the timer for a duration (e.g., indicated by d1 in timeline 700). Thus, the timer is turned on (plot 714) and may begin counting up and counting down for the duration. As described herein, the timer may be an internal chip of the control module or a timer of a BCM communicatively coupled to the control module (e.g., through a CAN).

After receiving a confirmation from the timer indicating that the selected alarm wake up time has been set, the WAKEM stores the global real time in non-volatile memory, transmits an indication to the startup/shutdown controller that it has finished scheduling the alarm wake (e.g., by setting a "run_done" flag) and, at time t4, transitions back to the inactivate state (plot 708). Further, at time t4, in response to receiving the indication from the WAKEM, the startup/shutdown controller shuts down the control module, such as by switching the power relay of the control module to an "off" state. Thus, the control module is transitioned to the sleep mode at time t4 (plot 704). A short duration after shutting down the control module, between time t4 and time t5, the startup/shutdown controller transitions to the "off" mode. Further, while the control module is in the sleep mode, the "run_done" flags of the other features (plot 710) and the requesting features (plot 712) may be cleared. In another example, the "run_done" flags may remain set, such as when the "run_done" flags are stored in non-volatile memory.

At time t5, the control module switches to the awake mode (plot 704) and the startup/shutdown controller transitions to the afterrun mode (plot 706) in response to the timer elapsing. For example, the control module may be operated in an alarm clock mode while in the awake mode in response to the timer elapsing (e.g., an alarm wake up). The WAKEM becomes active (plot 708) and compares the set timer duration, indicated by d1, with an elapsed duration between the stored global real time at time t3, when the timer was set, and a current global real time (e.g., at time t5). Dashed line 722a represents a first, higher threshold (e.g., in a positive time direction from the end of d1), and dashed line 722b represents a second, lower threshold (e.g., in a negative time direction from the end of d1). Times between the first, higher threshold and the second, lower threshold are within a threshold range from the set timer duration d1. As shown in plot 714, the elapsed duration between time t3 and time t5 is within the threshold range from the set timer duration d1, and therefore, the WAKEM may determine that the timer passes a threshold accuracy check. Further, the startup/shutdown controller may transmit a request to run to both the first requesting feature and the second requesting feature, which may each evaluate current vehicle conditions against their respective entry conditions. Further still, at time t5, the other features immediately set their "run_done" flags (plot 710), as the other features may not run while the control module is operating in the alarm clock mode.

At time t6, entry conditions for the second requesting feature are met (plot 718). Therefore, the second requesting feature is performed. However, the entry conditions for the first requesting feature are not met at time t6 (plot 716). The first requesting feature is not performed, and instead, the first requesting feature sets its "run_done" flag and continues checking its entry conditions while the second requesting feature is performed (along with any other requesting features with their entry conditions met).

At time t7, the second requesting feature finishes its task and sets its "run_done" flag. After the second requesting feature is performed, entry conditions for the second requesting feature are no longer met (plot 718). Further, at time t7, all of the requesting features have set their "run_done" flags, and thus, it is indicated that the requesting features are complete (plot 712). In response, the WAKEM is activated (plot 708) and again queries the requesting features for alarm wake up times. After receiving the new alarm wake up times from the requesting features, the WAKEM selects a new alarm wake up time, and at time t8, sets the timer for the new selected alarm wake up time (plot 714). However, in other examples, if a threshold number of alarm wakes has been performed during the key-off period, the WAKEM will not set the timer, and the requesting features will determine whether to perform their features or set a DTC, as described with respect to FIG. 5. After receiving a confirmation from the timer indicating that the new selected alarm wake up time has been set, the WAKEM indicates that it has finished scheduling the alarm wake to the startup/shutdown controller (e.g., by setting a "run_done" flag) and, at time t9, transitions back to the inactivate state (plot 708). Further, at time t9, in response to receiving the indication from the WAKEM, the startup/shutdown controller shuts down the control module, such as by switching the power relay of the control module to an "off" position, to transition the control module to the sleep mode (plot 704). A short duration after shutting down the control module, after time t9, the startup/shutdown controller transitions to the "off" mode.

In this way, an alarm wake system including a wake manager (WAKEM) may arbitrate a plurality of alarm wake requests from requesting features of a control module that are scheduled to be performed during a vehicle afterrun (e.g., during a key-off period). In particular, the WAKEM may prioritize one alarm wake up time of the plurality of received alarm wake up times from the requesting features and set a timer for the selected alarm wake up time prior to the control module shutting down. By scheduling a single alarm wake, conflicting alarm wakes, missed alarm wakes, and unexpected alarm wakes may be avoided, increasing the robustness of the alarm wake system. After the control module is awoken by the timer elapsing, all of the requesting features may determine whether their respective entry conditions are met, regardless of the alarm wake up time requested by each feature. Each requesting feature may be performed in response to its entry conditions being met, after which the control module is again shutdown. If entry conditions for a requesting feature are not met, the requesting feature may request a new alarm wake up time upon the control module shutdown being initiated if a number of alarm wakes during the key-off period is less than a threshold count. By only performing the requesting features, which may include diagnostic and non-diagnostic features, when entry conditions are met, false fault detection may be reduced, for example. Further, by limiting the number of alarm wakes during the key-off period to the threshold count, vehicle battery consumption during the key-off period may be reduced.

The technical effect of using a wake manager to schedule vehicle control module alarm wake requests from a plurality of requesting features and, upon the alarm wake, only performing each requesting feature in response to entry conditions being met is that alarm wake scheduling is simplified and each requesting feature is performed when conditions are optimal, thereby decreasing false fault detection.

As a first example, a method comprises: querying a first requesting feature and a second requesting feature for alarm wake up times; selecting a first alarm wake up time from the first requesting feature and not selecting a second alarm wake up time from the second requesting feature; setting a timer for the first alarm wake up time; and sending a request to run to both the first requesting feature and the second requesting feature upon the timer elapsing. In the preceding example, additionally or optionally, the requesting features are included in a control module of a vehicle, and the control module wakes up while the vehicle is off in response to the timer elapsing. In any or all of the preceding examples, additionally or optionally, querying the first requesting feature and the second requesting feature for alarm wake up times is based on a control module shutdown initiation, and the control module is shut down after setting the timer. In any or all of the preceding examples, additionally or optionally, the first requesting feature determines the first alarm wake up time based on current vehicle conditions and entry conditions for the first requesting feature, and the second requesting feature determines the second alarm wake up time based on current vehicle conditions and entry conditions for the second requesting feature. In any or all of the preceding examples, additionally or optionally, upon receiving the request to run, each of the first requesting feature and the second requesting feature runs based on entry conditions for the respective requesting feature and current vehicle conditions. In any or all of the preceding examples, the method additionally or optionally further comprises operating with the current vehicle conditions meeting the entry conditions for at least one of the first requesting feature and the second requesting feature; and in response to the current vehicle conditions meeting the entry conditions for the at least one of the first requesting feature and the second requesting feature, running the at least one of the first requesting feature and the second requesting feature. In any or all of the preceding examples, the method additionally or optionally further comprises operating with the current vehicle conditions not meeting the entry conditions for at least one of the first requesting feature and the second requesting feature; and in response to the current vehicle conditions not meeting the entry conditions for the at least one of the first requesting feature and the second requesting feature, not running the at least one of the first requesting feature and the second requesting feature. In any or all of the preceding examples, additionally or optionally, each of the first requesting feature and the second requesting feature indicates completion based on a determination of finishing its run. In any or all of the preceding examples, additionally or optionally, the control module shutdown initiation is based on at least one of a vehicle key-off status and each of the first requesting feature and the second requesting feature completion status. In any or all of the preceding examples, the method additionally or optionally further comprises, upon the timer elapsing from the first wake up time, clearing the timer; incrementing an alarm wake up counter; and setting the timer for a new wake up time based on a count of the alarm wake up counter and a subsequent control module shutdown initiation.

As another example, a method comprises: operating a control module of a vehicle in an alarm clock mode in response to an alarm wake up, the alarm wake up occurring while an ignition of the vehicle is in a key-off position; and operating the control module in a nominal mode in response to a non-alarm wake up. In the preceding example, additionally or optionally, the alarm wake up is triggered by a set timer elapsing and the non-alarm wake up is triggered by at least one of a vehicle door ajar signal, a vehicle key-on event, a vehicle remote start request, and a brake pedal of the vehicle being depressed. In any or all of the preceding examples, additionally or optionally, the control module performs a nominal startup procedure while operating in the nominal mode, the nominal startup procedure including priming a fuel rail of the vehicle and actuating one or more valves to determine end-stop positions of the one or more valves. In any or all of the preceding examples, additionally or optionally, the control module performs an alarm clock mode startup procedure while operating in the alarm clock mode, the alarm clock mode startup procedure including priming the fuel rail of the vehicle and not actuating the one or more valves. In any or all of the preceding examples, additionally or optionally, operating in the alarm clock mode further includes performing afterrun tasks, the afterrun tasks including diagnostic and non-diagnostic tasks performed by features enabled to schedule the alarm wake up.

As a further example, a system for a vehicle comprises: an engine system, including an engine configured to propel the vehicle by combusting air and fuel; a fuel system, including a fuel tank for storing the fuel; an evaporative emissions system in fluidic communication with the fuel system and an intake of the engine; a control system, including a plurality of control modules communicatively coupled over a controller area network; a first control module of the plurality of control modules, the first control module including an alarm wake system and storing instructions in non-transitory memory that, when executed, cause the first control module to: during a shutdown event, schedule an alarm wake up via the alarm wake system prior to transitioning to a sleep mode when an alarm wake up count is less than a threshold count; transition to the sleep mode without scheduling the alarm wake up when the alarm wake up count is equal to the threshold count. In the preceding example, additionally or optionally, the alarm wake system comprises a wake manager, a timer, a startup/shutdown controller, a plurality of requesting features, and a plurality of non-requesting features. In any or all of the preceding examples, additionally or optionally, the wake manager receives alarm wake up times from the plurality of requesting features and not from the plurality of non-requesting features, the wake manager selects one alarm wake up time from the received alarm wake up times, and the wake manager sets the timer for the selected one alarm wake up time. In any or all of the preceding examples, additionally or optionally, the startup/shutdown controller maintains a power relay of the control module in an "on" position while the alarm wake up is being scheduled and switches the power relay of the control module to an "off" position after the timer is set. In any or all of the preceding examples, additionally or optionally, the plurality of requesting features includes an engine-off evaporative emissions system diagnostic test, and the first control module stores further instructions in non-transitory memory that, when executed, cause the first control module to: transition from the sleep mode to an alarm wake mode responsive to the timer elapsing; transmit a request to run to each of the plurality of requesting features and none of the non-requesting features via the startup/shutdown controller; perform the engine-off evaporative emissions system diagnostic test responsive to entry conditions for the engine-off evaporative emissions system diagnostic test; and request a new alarm wake up time for the engine-off evaporative emissions system diagnostic test via the wake manager responsive to entry conditions for the engine-off evaporative emissions system diagnostic test not being met.

In another representation, a method comprises: querying a first requesting feature and a second requesting feature for alarm wake up times; selecting a wake up time from the first requesting feature and not from the second requesting feature based on criteria other than a time of the querying; and running both the first requesting feature and the second requesting feature based on the selected wake up time for the first requested feature. In the preceding example, additionally or optionally, the requesting features are included in a control module of a vehicle and the control module wakes up while the vehicle is off in response to the selected wake up time determined by a timer set for the selected wake up time.

In any or all of the preceding examples, additionally or optionally, the first requesting feature determines a first wake up time based on current vehicle conditions and entry conditions for the first requesting feature and the second requesting feature determines a second wake up time based on current vehicle conditions and entry conditions for the second requesting feature, and the first wake up time is the selected wake up time. In any or all of the preceding examples, additionally or optionally, one of the first requesting feature and second requesting feature is an evaporative emissions system diagnostic. In any or all of the preceding examples, additionally or optionally, one of the first requesting feature and second requesting feature is a nitrogen oxide sensor diagnostic test. In any or all of the preceding examples, additionally or optionally, one of the first requesting feature and second requesting feature is a low voltage setpoint manager. In any or all of the preceding examples, additionally or optionally, running both the first requesting feature and the second requesting feature includes transmitting a requesting to run to each of the first requesting feature and the second requesting feature upon the timer set for the selected wake up time elapsing. In any or all of the preceding examples, additionally or optionally, running both the first requesting feature and the second requesting feature further includes each of the first requesting feature and the second requesting feature independently running based on the current vehicle conditions and respective entry conditions. In any or all of the preceding examples, the method additionally or optionally further comprises each of the first requesting feature and the second requesting feature independently indicating completion based on a determination of finishing its run. In any or all of the preceding examples, the method additionally or optionally further comprises querying the first requesting feature and the second requesting feature for new alarm wake up times based on a completion status of each of the first requesting feature and the second requesting feature.

In another further representation, a method for a vehicle comprises: operating in one of an alarm clock mode and a nominal mode based on at least one of a status of a timer and an ignition status of the vehicle. In any or all of the preceding examples, the method additionally or optionally further comprises the timer elapsing and the ignition status indicating an off state of the vehicle; and in response to the timer elapsing and the off state of the vehicle, operating in the alarm clock mode. In any or all of the preceding examples, the method additionally or optionally further comprises the ignition status indicating an on state of the vehicle; and in response to the on state of the vehicle, operating in the nominal mode. In any or all of the preceding examples, the timer is set during a shutdown event of a control module of the vehicle. In any or all of the preceding examples, a time set on the timer is based on vehicle conditions during the shutdown event and entry conditions for a requesting feature. In any or all of the preceding examples, additionally or optionally, operating in the alarm clock mode includes priming a fuel rail of the vehicle during startup. In any or all of the preceding examples, additionally or optionally, operating in the nominal mode includes priming the fuel rail of the vehicle and actuating one or more valves during startup.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   querying a first requesting feature and a second requesting feature for alarm wake up times responsive to a key-off event of a vehicle and prior to a control module of the vehicle being shut down;
   selecting a first alarm wake up time from the first requesting feature and not selecting a second alarm wake up time from the second requesting feature;
   setting a timer for the first alarm wake up time prior to the control module being shut down; and
   waking the control module and sending a request to run to both of the first requesting feature and the second requesting feature upon the timer elapsing at the first alarm wake up time.

2. The method of claim 1, wherein the first requesting feature and the second requesting feature are included in the control module, and the control module wakes up while the vehicle is off in response to the timer elapsing.

3. The method of claim 2, wherein the control module is shut down after setting the timer.

4. The method of claim 3, wherein the first requesting feature determines the first alarm wake up time based on current vehicle conditions and entry conditions for the first requesting feature, and the second requesting feature determines the second alarm wake up time based on the current vehicle conditions and entry conditions for the second requesting feature.

5. The method of claim 4, further comprising:
upon receiving the request to run, running the first requesting feature responsive to the current vehicle conditions meeting the entry conditions for the first requesting feature and running the second requesting feature responsive to the current vehicle conditions meeting the entry conditions for the second requesting feature.

6. The method of claim 5, wherein each of the first requesting feature and the second requesting feature indicates completion based on a determination of finishing its run.

7. The method of claim 6, further comprising:
initiating a shutdown of the control module after each of the first requesting feature and the second requesting feature indicates completion.

8. The method of claim 7, further comprising:
upon the timer elapsing at the first alarm wake up time, clearing the timer;
incrementing an alarm wake up counter; and
setting the timer for a new wake up time based on a count of the alarm wake up counter after initiating the shutdown of the control module.

9. The method of claim 4, further comprising:
operating with the current vehicle conditions meeting the entry conditions for at least one of the first requesting feature and the second requesting feature; and
in response to the current vehicle conditions meeting the entry conditions for the at least one of the first requesting feature and the second requesting feature, running the at least one of the first requesting feature and the second requesting feature.

10. The method of claim 4, further comprising:
operating with the current vehicle conditions not meeting the entry conditions for at least one of the first requesting feature and the second requesting feature; and
in response to the current vehicle conditions not meeting the entry conditions for the at least one of the first requesting feature and the second requesting feature, not running the at least one of the first requesting feature and the second requesting feature.

11. A method, comprising:
operating a control module of a vehicle in an alarm clock mode in response to an alarm wake up, the alarm wake up occurring during a key-off period and triggered by a set timer elapsing, the set timer scheduled by a wake manager of the control module responsive to a number of alarm wake ups during the key-off period being less than a threshold; and
operating the control module in a nominal mode in response to a non-alarm wake up.

12. The method of claim 11, wherein the key-off period occurs while an ignition of the vehicle is in a key-off position, and the non-alarm wake up is triggered by at least one of a vehicle door ajar signal, a vehicle key-on event, a vehicle remote start request, and a brake pedal of the vehicle being depressed.

13. The method of claim 11, wherein the control module performs a nominal startup procedure while operating in the nominal mode, the nominal startup procedure including priming a fuel rail of the vehicle and actuating one or more valves to determine end-stop positions of the one or more valves.

14. The method of claim 13, wherein the control module performs an alarm clock mode startup procedure while operating in the alarm clock mode, the alarm clock mode startup procedure including priming the fuel rail of the vehicle and not actuating the one or more valves.

15. The method of claim 14, wherein operating in the alarm clock mode further includes performing afterrun tasks, the afterrun tasks including diagnostic and non-diagnostic tasks performed by features enabled to schedule the alarm wake up.

16. A system for a vehicle, comprising:
an engine system, including an engine configured to propel the vehicle by combusting air and fuel;
a fuel system, including a fuel tank for storing the fuel;
an evaporative emissions system in fluidic communication with the fuel system and an intake of the engine;
a control system, including a plurality of control modules communicatively coupled over a controller area network; and
a first control module of the plurality of control modules, the first control module including an alarm wake system and storing instructions in non-transitory memory that, when executed, cause the first control module to:
during a shutdown event,
schedule an alarm wake up via the alarm wake system prior to transitioning to a sleep mode when an alarm wake up count is less than a threshold count; and
transition to the sleep mode without scheduling the alarm wake up when the alarm wake up count is equal to the threshold count.

17. The system of claim 16, wherein the alarm wake system comprises a wake manager, a timer, a startup/shutdown controller, a plurality of requesting features, and a plurality of non-requesting features.

18. The system of claim 17, wherein the wake manager receives alarm wake up times from the plurality of requesting features and not from the plurality of non-requesting features, the wake manager selects one alarm wake up time from the received alarm wake up times, and the wake manager sets the timer for the selected one alarm wake up time.

19. The system of claim 18, wherein the startup/shutdown controller maintains a power relay of the first control module in an "on" position while the alarm wake up is being scheduled and switches the power relay of the first control module to an "off" position after the timer is set.

20. The system of claim 19, wherein the plurality of requesting features includes an engine-off evaporative emissions system diagnostic test, and the first control module stores further instructions in non-transitory memory that, when executed, cause the first control module to:
transition from the sleep mode to an alarm wake mode responsive to the timer elapsing;
transmit a request to run to each of the plurality of requesting features and none of the non-requesting features via the startup/shutdown controller;
perform the engine-off evaporative emissions system diagnostic test responsive to entry conditions for the engine-off evaporative emissions system diagnostic test being met; and
request a new alarm wake up time for the engine-off evaporative emissions system diagnostic test via the wake manager responsive to the entry conditions for the engine-off evaporative emissions system diagnostic test not being met.

* * * * *